(12) United States Patent
Wentz

(10) Patent No.: US 11,379,263 B2
(45) Date of Patent: Jul. 5, 2022

(54) SYSTEMS, DEVICES, AND METHODS FOR SELECTING A DISTRIBUTED FRAMEWORK

(71) Applicant: Ares Technologies, Inc., Cambridge, MA (US)

(72) Inventor: Christian T. Wentz, Providence, RI (US)

(73) Assignee: Ares Technologies, Inc., Boston, MA (US)

( * ) Notice: Subject to any disclaimer, the term of this patent is extended or adjusted under 35 U.S.C. 154(b) by 34 days.

(21) Appl. No.: 16/812,094

(22) Filed: Mar. 6, 2020

(65) Prior Publication Data

US 2020/0201679 A1 Jun. 25, 2020

Related U.S. Application Data

(63) Continuation-in-part of application No. 16/539,206, filed on Aug. 13, 2019.

(60) Provisional application No. 62/718,376, filed on Aug. 13, 2018.

(51) Int. Cl.
| | |
|---|---|
| *G06F 9/46* | (2006.01) |
| *G06F 9/48* | (2006.01) |
| *G06F 9/50* | (2006.01) |
| *H04L 9/32* | (2006.01) |
| *G06F 16/29* | (2019.01) |
| *G06F 9/38* | (2018.01) |
| *G06F 9/455* | (2018.01) |

(52) U.S. Cl.
CPC .......... *G06F 9/4881* (2013.01); *G06F 9/3891* (2013.01); *G06F 9/5044* (2013.01); *G06F 16/29* (2019.01); *H04L 9/3213* (2013.01)

(58) Field of Classification Search
CPC ...... G06F 16/29; G06F 9/3891; G06F 9/4881; G06F 9/5044; H04L 9/3213
See application file for complete search history.

(56) References Cited

U.S. PATENT DOCUMENTS

| | | | | |
|---|---|---|---|---|
| 9,258,331 | B2 * | 2/2016 | Dyer | ................... H04L 63/0876 |
| 9,584,517 | B1 | 2/2017 | Roth | |
| 10,320,569 | B1 * | 6/2019 | Wentz | ................... G06F 21/645 |
| 10,382,962 | B2 * | 8/2019 | Walsh | ................... H04L 9/3218 |

(Continued)

OTHER PUBLICATIONS

Timo Hanke, Dfinity Technology Overview Series Consensus System, Jan. 23, 2018.

(Continued)

*Primary Examiner* — Gary S Gracia
(74) *Attorney, Agent, or Firm* — Caldwell Intellectual Property Law; Keegan Caldwell

(57) ABSTRACT

A method of selecting a distributed framework includes identifying, by a selection device coupled to a memory, at least a first remote device of a plurality of remote devices, wherein identifying the at least a first remote device further comprises and evaluating a secure proof generated by the at least a first remote device, and identifying the at least a first remote device as a function of the secure proof, assigning, by the selection device, a confidence level of the at least a first remote device, and selecting, by a selection device, a distributed framework from the plurality of remote devices as a function of the confidence level, and assigning a task to the distributed framework.

22 Claims, 7 Drawing Sheets

(56) References Cited

U.S. PATENT DOCUMENTS

| | | | |
|---|---|---|---|
| 2008/0222425 A1* | 9/2008 | Buss | H04L 63/0823 713/185 |
| 2009/0271618 A1 | 10/2009 | Camenisch | |
| 2010/0153928 A1* | 6/2010 | Livshits | H04L 43/50 717/135 |
| 2013/0125226 A1* | 5/2013 | Shah | H04W 12/0431 726/7 |
| 2013/0174241 A1* | 7/2013 | Cha | H04W 12/0431 726/7 |
| 2014/0173274 A1 | 6/2014 | Chen | |
| 2014/0222730 A1* | 8/2014 | Vasseur | G06F 11/3433 706/12 |
| 2014/0366111 A1 | 12/2014 | Sheller | |
| 2015/0244685 A1* | 8/2015 | Shah | H04L 63/0428 713/155 |
| 2015/0256341 A1 | 9/2015 | Ye | |
| 2015/0288521 A1* | 10/2015 | Nahari | H04L 63/0853 713/170 |
| 2015/0341792 A1* | 11/2015 | Walsh | H04W 12/08 713/176 |
| 2016/0127351 A1* | 5/2016 | Smith | G06F 21/31 726/10 |
| 2016/0182497 A1* | 6/2016 | Smith | H04L 9/3226 713/156 |
| 2017/0093803 A1* | 3/2017 | Nayshtut | H04L 63/1441 |
| 2017/0093806 A1* | 3/2017 | Phegade | H04L 63/0428 |
| 2017/0155662 A1* | 6/2017 | Courbon | H04L 63/107 |
| 2017/0178237 A1 | 6/2017 | Wong | |
| 2017/0249464 A1 | 8/2017 | Maximov | |
| 2017/0344731 A1* | 11/2017 | Gefflaut | G06F 21/6218 |
| 2018/0006829 A1* | 1/2018 | Kravitz | H04W 12/06 |
| 2018/0034642 A1 | 2/2018 | Kaehler | |
| 2018/0131685 A1* | 5/2018 | Sridhar | H04L 9/3265 |
| 2018/0183586 A1* | 6/2018 | Bhargav-Spantzel | G06F 21/32 |
| 2018/0336552 A1* | 11/2018 | Bohli | G06Q 20/065 |
| 2018/0337920 A1* | 11/2018 | Stites | G06F 21/73 |
| 2018/0349610 A1* | 12/2018 | Gupta | G06F 21/51 |
| 2018/0351753 A1* | 12/2018 | Gardner | H04L 9/3218 |
| 2019/0028281 A1* | 1/2019 | Turissini | G06F 21/57 |
| 2019/0303541 A1* | 10/2019 | Reddy | G06F 21/64 |
| 2019/0303579 A1* | 10/2019 | Reddy | G06F 21/51 |
| 2019/0303623 A1* | 10/2019 | Reddy | H04L 9/3239 |
| 2019/0305957 A1* | 10/2019 | Reddy | G06F 8/60 |
| 2019/0305959 A1* | 10/2019 | Reddy | G06F 8/60 |
| 2019/0306173 A1* | 10/2019 | Reddy | H04L 9/0637 |
| 2019/0312734 A1* | 10/2019 | Wentz | H04L 9/3265 |

OTHER PUBLICATIONS

Peter Robinson, Decentralized Random Number Generation, Jul. 5, 2018, Consensys.

* cited by examiner

SYSTEMS, DEVICES, AND METHODS FOR SELECTING A DISTRIBUTED FRAMEWORK

CROSS-REFERENCE TO RELATED APPLICATIONS

This application is a continuation-in-part of U.S. Nonprovisional application Ser. No. 16/539,206, filed on Aug. 13, 2019 and entitled "SYSTEMS, DEVICES, AND METHODS FOR SELECTING A DISTRIBUTED FRAMEWORK", which claims priority to U.S. Provisional Application No. 62/718,376 filed on Aug. 13, 2018 and entitled "SYSTEMS, DEVICES, AND METHODS FOR SELECTING A DISTRIBUTED FRAMEWORK." Each of U.S. Nonprovisional application Ser. No. 16/539,206 and U.S. Provisional Application No. 62/718,376 is incorporated herein by reference in its entirety.

FIELD OF THE INVENTION

The present invention generally relates to the field of data storage and authentication in distributed computing systems. In particular, the present invention is directed to systems, devices, and methods for selecting a distributed framework.

BACKGROUND

Distributed frameworks can provide a useful way to perform complex computation, or computation involving large datasets, rapidly and efficiently, as well as a way to distribute computational tasks across multiple devices. However, processes for selection and use of distributed frameworks are often inefficient or insecure, may over-rely on centrally managed security, or may suffer a lack of efficient scalability.

SUMMARY OF THE DISCLOSURE

In an aspect, a method of selecting a distributed framework includes receiving, by a selection device, a description of a computing task to be performed. The method includes selecting, by the selection device, at least a remote device, of a plurality of remote devices, for inclusion in a distributed framework, where selecting further includes receiving a first authorization token including a secure proof of an attestation conferring a first credential on the at least a remote device, evaluating the first authorization token, and selecting the at least a remote device based on the evaluation of the first authorization token. The method includes assigning, by the selection device, the computing task to the at least a remote device.

In another aspect, a system for selecting a distributed framework includes a selection device in communication with a plurality of remote devices. The selection device is designed and configured to receive a description of a computing task to be performed, select at least a remote device, of a plurality of remote devices, for inclusion in a distributed framework, wherein selecting includes receiving a first authorization token including a secure proof of an attestation conferring a first credential on the at least a remote device, evaluating the first authorization token, and selecting the at least a remote device based on the evaluation of the first authorization token, and assign the computing task to the at least a remote device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
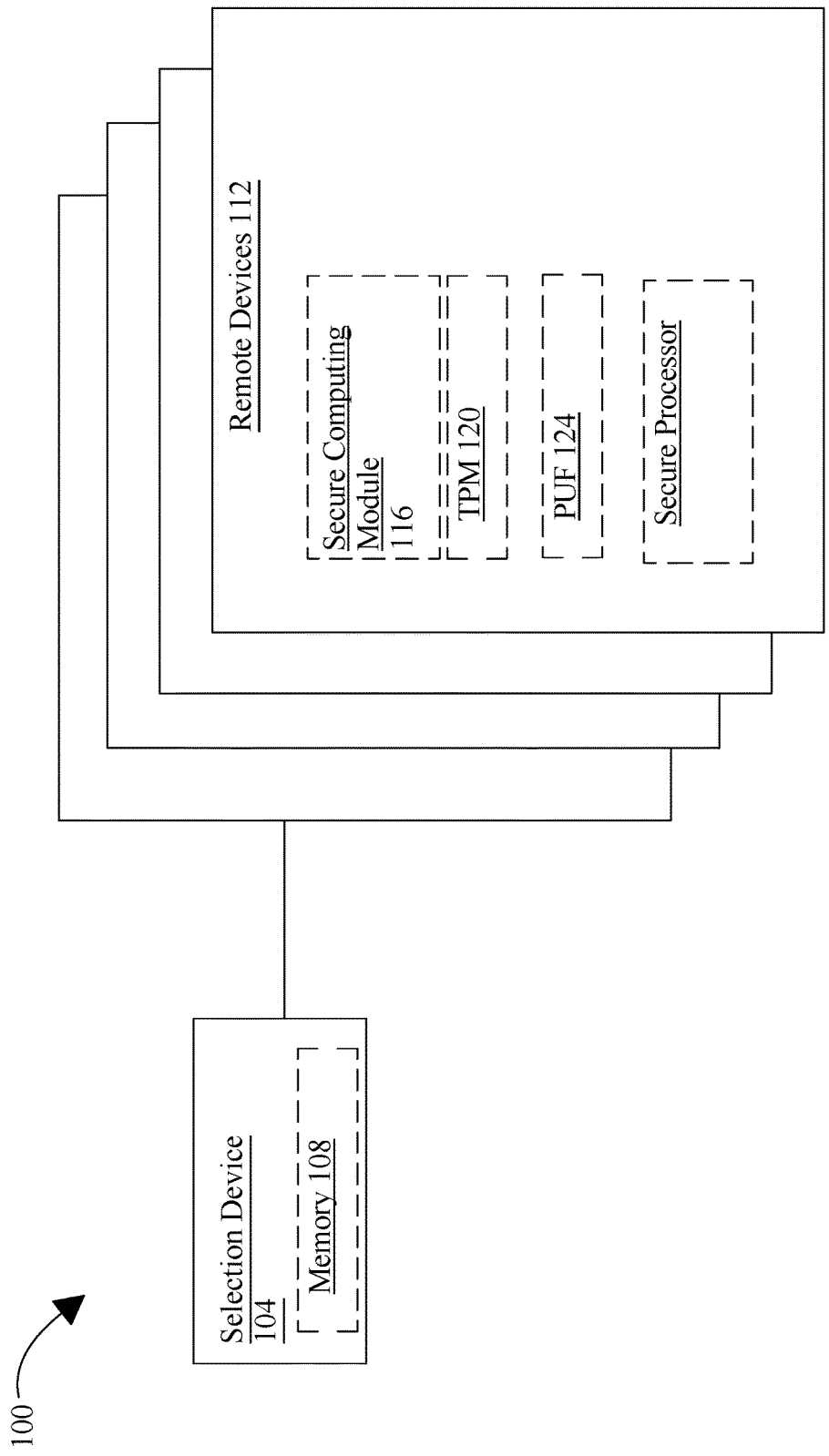
FIG. 1 is a block diagram illustrating an exemplary embodiment of a system for selecting a distributed framework.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In an embodiment, disclosed systems and methods present a flexible, scalable, and reliable method for selecting and deploying an optimally secure and efficient distributed network. Use of trusted hardware and related technology may enable rapid and decentralized authentication of devices; in embodiments, block-chains or similar distributed data management facilities may be used in authentication and device selection, permitting efficiency of rapid lookup to be coupled to reliability of consensus and other methods for authentication. In an embodiment, disclosed systems and methods may present a flexible, scalable, and reliable method for selecting and utilizing an optimally secure data storage device or set of data storage devices to store data to be used in machine learning processes. Use of confidence levels assigned to data storage devices may enable rapid authentication of devices. Devices may perform machine learning data storage tasks redundantly or distinctly as a function of trusted confidence levels.

Systems and methods as described herein may involve computation, calculation, assessment, assignment, or use of a confidence level associated with one or more processes, devices, or data, including without limitation one or more processes, appraisals, and/or remote devices as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In an embodiment, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Nonprovisional application Ser. No. 16/682,809, filed on Nov. 13, 2019, and entitled "METHODS AND SYSTEMS FOR IMPLEMENTING AN ANONYMIZED ATTESTATION CHAIN," the entirety of which is incorporated herein by reference.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 116 as described in further detail below; in such scenarios, authentication may include proof by the secure computing module 116 that the secure computing module 116 possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Certificate authority may be implemented in a number of ways, including without limitation as described in U.S. Nonprovisional application Ser. No. 16/681,750, filed on Nov. 12, 2019, and entitled "SYSTEMS AND METHODS FOR DISTRIBUTED KEY STORAGE," the entirety of which is incorporated herein by reference; for instance, and without limitation, certificate authority may include, be included in, and/or be implemented as a distributed certificate authority as described in Non-provisional application Ser. No. 16/682,809.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments of the disclosed methods and systems may involve performance of one or more machine-learning algorithms. Machine-learning algorithms as used herein are processes executed by computing devices to improve accuracy and efficiency of other processes performed by the computing devices through statistical or mathematical measures of accuracy and efficiency. Machine-learning algorithms may function by measuring a difference between predicted answers or outputs and goal answers or outputs representing ideal or "real-world" outcomes the other processes are intended to approximate. Predicted answers or outputs may be produced by an initial or intermediate version of the process to be generated, which process may be modified as a result of the difference between predicted answers or outputs and goal answers or outputs. Initial processes to be improved may be created by a programmer or user, or may be generated according to a given machine-learning algorithm using data initially available. Inputs and goal outputs may be provided in two data sets from which the machine learning algorithm may derive the above-described calculations; for instance, a first set of inputs and corresponding goal outputs may be provided, and used to create a mathematical relationship between inputs and outputs that forms a basis of an initial or intermediate process, and which may be tested against further provided inputs and goal outputs. Data sets representing inputs and corresponding goal outputs may be continuously updated with additional data; machine-learning process may continue to learn from additional data produced when machine learning process analyzes outputs of "live" processes produced by machine-learning processes. For instance, a model created by a machine-learning algorithm may include a mathematical relationship a datum of a training set and an output of the model and may modify or optimize that relationship according to a corpus of data and a set of outputs that a user has specified as aligned with elements in the corpus of data. User feedback, as described below, may be arranged to produce further inputs and goal outputs, permitting further optimization of models produced by machine-learning algorithms.

Machine-learning algorithms may include linear regression processes, which attempt to generate a mathematical relationship relating a linear combination of inputs to goal outputs. Such processes may include without limitation ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression processes may include ridge regression methods, where the function to be minimized includes the least-squares function plus term multiplying the square of each coefficient by a scalar amount to penalize large coefficients. Linear regression processes may include lasso models, in which ridge regression is combined with multiplying the least-squares term by a factor of 1 divided by double the number of samples. Linear regression processes may include a multi-task lasso model wherein the norm applied in the least-squares term of the lasso model is the Frobenius norm amounting to the square root of the sum of squares of all terms. Linear regression processes may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, or any other suitable model that may occur to persons skilled in the art upon reviewing the entirety of this disclosure. Linear regression processes may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest-neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Referring now to FIG. 1, a system 100 for selecting a distributed framework is illustrated. System 100 includes a selection device 104. Selection device 104 may include any computing device as described in this disclosure, including without limitation a microcontroller, microprocessor, digital signal processor (DSP) and/or system on a chip (SoC), or a Graphic Processing Unit (GPU) as described in this disclosure. Selection device 104 may include, be included in, and/or communicate with a mobile device such as a mobile telephone or smartphone. Selection device 104 may include a single computing device operating independently, or may include two or more computing device operating in concert, in parallel, sequentially or the like; two or more computing devices may be included together in a single computing device or in two or more computing devices. Selection device 104 may interface with one or more additional devices as described below in further detail via a network interface device. Network interface device may be utilized for connecting a selection device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Selection device 104 may include but is not limited to, for example, a selection device 104 or cluster of computing devices in a first location and a second computing device or cluster of computing devices in a second location. Selection device 104 may include one or more computing devices dedicated to data storage, security, distribution of traffic for load balancing, and the like. Selection device 104 may distribute one or more computing tasks as described below across a plurality of computing devices of computing device, which may operate in parallel, in series, redundantly, or in any other manner used for distribution of tasks or memory between computing devices. Selection device 104 may be implemented using a "shared nothing" architecture in which data is cached at the worker, in an embodiment, this may enable scalability of system 100 and/or computing device. Selection device 104 may include in non-limiting example one or more FPGAs or other programmable logic-based hardware. In the case of programmable logic-based hardware, selection device 104 may incorporate protection mechanisms to ensure the authenticity and confidentiality of the bitstream and other configuration parameters used to set up the desired logic in the programmable logic-based hardware. These protection mechanisms may include public/private key encryption and any other approaches described below. Selection device 104 may further incorporate random number generator, true random number generator, synthesizable physically unclonable function (PUF) or such similar feature to provide a cryptographically strong seed for public/private key encryption of other methods using private keys. Attested properties as described below may in the case of programmable logic further include attestation of the authenticity and or proof of unadulterated configured logic. In a non-limiting example, selection device 104 and/or data storage device 112 may be hosted by a third party, e.g. as a "cloud service."

Still referring to FIG. 1, selection device 104 is coupled to a memory 108. Memory 108 may include any form of memory described in this disclosure. Memory 108 may be incorporated in a device containing selection device 104, distributed through several devices, which may contain selection device 104, or a component thereof, or in another device accessible to selection device 104 via electronic communication. Selection device 104 may be communicatively connected a plurality of remote devices 112. Selection device 104 may be designed and configured to perform any method step or steps as disclosed herein; as a non-limiting example, selection device 104 may be designed and configured to identify at least a first remote device of the plurality of remote devices assign a confidence level of the at least a first remote device, and select a distributed framework from the plurality of remote devices as a function of the at least a first remote device as a function of the confidence level.

With continued reference to FIG. 1, any remote device of plurality of remote devices may include a secure computing module 116. As used herein, a secure computing module 116 is a hardware element configured to perform one or more secured operations beyond the control of other circuit elements or software, whether incorporated with the secure computing module 116 in a circuit or computing device, or a part of an extrinsic computing device. As a result, at least one secured operation performed by secure computing module 116 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 116 and/or a system or computing device incorporating secure computing module 116 based on the above-described set of assumptions. As a non-limiting, example, a secure computing module 116 designed to produce an expected result despite all software-only attacks may give rise to a first confidence level, whereas another secure computing module 116 designed to produce its expected result in the face of all software or hardware attacks may give rise to a second confidence level; the second confidence level may be higher, owing to the reduced probability that the second secure computing module 116 would be compromised.

Still viewing FIG. 1, secure computing module 116 may include a trusted platform module (TPM 120). In an embodiment, a TPM 120 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 120 may have any suitable elements of digital or analog circuitry usable to perform one or more processes as described herein, including without limitation processes used to determine confidence levels and/or authenticate digitally signed assertions as described below. TPM 120 may have memory and/or other logic and/or a processor in its own right which may be in a non-limiting example a crypto-processor. TPM 120 may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 116 may include at least PUF 124. PUF 124 may be implemented by various means. In an embodiment, PUF 124 includes one or more non-intrinsic PUFs. Non-intrinsic PUFs may include without limitation optics-based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photo-diodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics-based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 124 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay-based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 124 may include a circuit producing a PUF via cross-coupled logical or analog circuit elements. As a non-limiting example, static random access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 124 in an embodiment include without limitation buskeeper PUFs, which may be similar to other PUFs based on bistable memory elements, but leveraging buskeeper cells. PUF 124 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate, but is bistable (like the SRAM PUF). Using reset logic, the bistable ring may destabilize and subsequently stabilize into a state that is set by the random silicon manufacturing variations.

Continuing to view FIG. 1, PUF 124 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF 124 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-acorn dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range, and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker, and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204a-b. A number of dots in a device such as an RTD does may not be reproducible, or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 124 may include, without limitation, PUFs implemented using design of vertical interconnect accesses (Ms) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 124 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency, Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate, Fabrication may include incorporation of the light source. In operation, Optical output waveforms may also be complex and highly sensitive to precise physical cavity, structure; at the same time responses may remain highly repeatable. Continuing the example, ultrashort optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 124 that may be used may include, without limitation, nano-electromechanical (NEM) PUFs. NEM PUFs may include PUFs that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation; exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 124 and/or TPM 120; such outputs may be used to generate symmetric or asymmetric keys, private keys, zero-knowledge proofs, or other proofs of authenticity, as described in further detail below.

Continuing to refer to FIG. 1, secure computing module 116 may implement one or more secure memory storage protocols. One or more secure memory storage protocols may be protocols designed to prevent unauthorized access to memory and/or to protect secure computing module 116 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 116. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software based encryption techniques discussed in this disclosure. In an embodiment, secure computing module 116 may incorporate a memory controller located within the trusted computing boundary to encrypt and authenticate by a secret key memory elements such as without limitation memory page tables and/or memory pages accessible by other software elements, such as an operating system. Various techniques, processes, means or elements may be used to implement the above-described secure memory protocols. For instance, secure computing module 116 may use hardware-enabled access control to protect memory access; hardware access control may, as a non-limiting example, be performed by tagging each memory entry with a "container identifier" corresponding to a page, file, or other grouping of memory, enabling secure computing module 116 to determine whether tampering has occurred.

Secure computing module 116 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 116 may operate using one or more dedicated memory objects, registers, or storage elements; as a non-limiting example, secure computing module 116 may operate with dedicated cache lines not available to other processes or circuits, preventing, e.g., stack or buffer overrun attacks to corrupt or steal data. Dedicated memory elements may be wired only to secure computing module 116; access to dedicated memory elements may be rendered impossible except by way of secure computing module 116. Secure computing module 116 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any secure listing as described below, including without limitation blockchains and the like. Secure computing module 116 may utilize oblivious random access memory (RAM) wherein memory access patterns are obfuscate to prevent detection of memory access patterns by outside observers attempting to deduce execution details regarding processes performed using secure computing module 116 Secure computing module 116 and/or device incorporating secure computing module 116 may incorporate a trusted non-volatile storage device that provides some means of verification of secure storage capability and other properties. Memory protocols as described above may be used to implement methods of attested storage and the chain of trust beginning at PUF 124 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 116.

Still referring to FIG. 1, secure computing module 116 may include a secure processor. Secure processor may be a processor as described below in reference to FIG. 5. Secure processor may operate autonomously from other processors and/or an operating system operating on at least a remote device; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM 120, to frustrate alteration and/or probing to discover and/or alter private keys. Private keys may be demonstrable as uniquely associated with secure processor by use of PUF 124 as described above; secure processor may include, for instance, a TPM 120 as described above. Alternatively or additionally, a certificate authority as described above, which may be a manufacturer of secure processor, may verify that one or more public keys are associated uniquely with secure processor according to any protocol suitable for digital certificates.

With continued reference to FIG. 1, secure computing module 116 may implement one or more methods of attested computation. Attested computation may include or involve one or more methods to ensure that computation of a program, known as an attested program, is trusted and signed by secure computing module 116 and/or computing device incorporating secure computing module 116; this may be supported by means to assert the state of the system memory, code, and input data. In an embodiment, secure computing module 116 and/or a computing device incorporating secure computing module 116 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 116 and/or computing device incorporating secure computing module 116 may append a cryptographic signature based upon any private key that may be associated with secure computing module 116 as described herein. Secure computing module 116 and/or computing device incorporating secure computing module 116 may operate a security reset of working memory prior to load of data for trusted computation; for instance, the secure computing module 116 and/or computing device incorporating secure computing module 116 may append a hash of the memory to cryptographic hash of system state following reset and prior to loading data. Secure computing module 116 and/or computing device incorporating secure computing module 116 may append its authentication signature of memory page tables and/or memory tables. Upon completion of the trusted computation, which may include execution of program code of system state, secure computing module 116 and/or computing device incorporating secure computing module 116 may append an output value of the trusted computation to cryptographic hash of system state. In an embodiment, an output value of the trusted computation may itself be cryptographically hashed and/or encrypted; encryption may be performed using any form of hardware or software based encryption that may be associated with secure computing module 116. Secure computing module 116 and/or computing device incorporating secure computing module 116 may include a system to compute one or more hash trees of cryptographic hash of the computation, system state, and/or outputs; secure computing module 116 and/or computing device incorporating secure computing module 116 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still viewing FIG. 1, in an embodiment, a non-secure processor and/or secure computing module 116 initiate a trusted protocol stack upon startup. For instance, and without limitation, selection device 104 and/or secure computing module 116 may implement a secure boot and/or attested boot protocol. In an embodiment, a basic input/output system (BIOS) that initiates upon startup of selection device 104 may compute a cryptographic hash of a boot loader of an operating system running on selection device 104; cryptographic hash may include boot drivers of one or more processes that initiate when selection device 104 starts up. Secure computing module 116 may then digitally sign cryptographic hash; cryptographic hash with or without digital signature, may be stored in memory. Selection device 104 may subsequently refuse to load any process that is not also signed with digital signature; this may in turn be used to perform attested computing procedures as described above.

Continuing to refer to FIG. 1, selection device 104 may implement at least a software monitor to enforce security invariants, and protected memory primitives, which may be referred to herein as enclaves. As used herein, a software monitor is a software component that operates in highest privilege mode of the processor, such as without limitation machine mode in the non-limiting example of the RISC-V processor ISA and may have exclusive access to a portion of memory, e.g. DRAM. The software monitor may check allocation decisions of software operating on selection device 104 and or a plurality of processors and/or computing devices making up a secure enclave for correctness and commit them into hardware configuration registers. Such software may include without limitation operating system, kernel, hypervisor, and/or guest OS. In this nomenclature, an operating system handles scheduling and demand paging, and a hypervisor may multiplex CPU cores of selection device 104 or devices. In a representative embodiment, software monitor may intermediate untrusted system software handling of isolated machine resources. Software monitor may verify decisions made by software operating on selection device 104 and/or devices for any events that may cause change in the protection domain/privilege mode of the selection device 104 and/or devices, including without limitation interrupts and fault handling, and may configure low level hardware resources when in at least a particular privilege mode. Hardware resources may include, without limitation, memory, such as physical memory pages, cache lines, processor cores that include all microarchitectural state, L1 cache and register files, and other resources. Software monitor may consider isolated protection domains including the monitor itself, enclaves, and untrusted software. Software monitor may ensure that resource allocation for one protection domain may not be modified by any other domain.

Still referring to FIG. 1, software monitor may be implemented in microcode, operate in the highest privilege level (e.g. machine mode in RISC-V processor), be implemented in hard coded logic, reconfigurable logic with protections on reconfiguration, or any combination of the foregoing. As a non-limiting example, software monitor may be invoked when software is executed in a secure enclave, and handle context switches between secure enclave mode, to and from less privileged mode(s). Software monitor may receive interrupt requests when operating a secure enclave operation, exit enclave operation including flushing of state and in example parking of enclave execution, and delegate the interrupt back to the operating system. Software monitor may intermediate handling of machine resources analogous to system calls in a typical OS. Software monitor may be conceived of as a state machine having states that may, as a non-limiting example, implement steps as follows: Software monitor may receive an event and authenticate a caller of the event; this may lead to three possibilities: (1) If caller is an OS interrupt and a secure enclave isn't operating, then the OS may receive the event; (2) If caller is an enclave interrupt, and the enclave has the handler, then the enclave may receive the event; otherwise, the enclave may asynchronously exit, meaning enclave cleans sensitive processor state, may park the enclave state in protected memory, and may delegate event to the OS—otherwise, the enclave may receive the event; (3) If event is a monitor call, and caller is authorized, then the request may be validated. If the request is concurrent, it may be handled, if it is invalid, it is thrown out and the caller may be flagged as potentially malicious; if it is valid, and no concurrent operations are happening, the monitor may proceed to change state cleanly (e.g., clean sensitive processor state and then switch privilege modes.

Continuing to refer to FIG. 1, to ensure protection domains are enforced, software monitor may enforce resource state transitions, which may occur in a non-limiting example as follows: if a resource requested is owned by owner (current user) or software monitor itself, the resource may be blocked. A requesting OS may demand the resource, in which case the sensitive processor state may be cleaned, and resource made available; finally the OS may grant the resource to a new owner. Software monitor may include a map of resource to owner, and lock on resource. These resource metadata may be pre-allocated to the monitor's binary image in case of statically partitioned resources such as cores and cache partitions. Software monitor may contain a cryptographic measurement (e.g. a hash) of certificates, keys, and of at least a first enclave. In an embodiment, software monitor may include an associated base address/address mask pair register in hardware that protects the location of the software monitor in memory space from corruption, bitmapped protected memory provisions, and the creation of page tables for each enclave within protected memory.

A secure boot and/or attested boot process may be used to achieve trustworthiness of software monitor and/or selection device 104 may execute a chain of attested boot upon reset to prove that the software monitor has not been tampered with and the at least a first enclave, referred to below as the signing enclave, is correctly constructed, such that core executed within the enclave may be considered trusted. Reset may occur on startup, restart, and/or upon a hard or soft reset of selection device 104.

Continuing to view FIG. 1, a non-limiting example illustrating, an attested boot sequence in a processor with at least one core is presented; this example is provided for expository purposes, and implementation of attested boot, related secure programming using selection device 104 and/or secure computing module 116 may be performed according to any processes and/or procedures that may occur to persons skilled in the art upon reviewing the entirety of this disclosure may operate according to an assumption that selection device 104 possesses a device specific secret, such as without limitation a cryptographic key pair, has been signed by a manufacturer of secure computing module 116, selection device 104 and/or other component or module described herein, such that one may evaluate the authenticity of the device by proof of possession of a valid signature; a device specific secret has been signed by a manufacturer, as used herein, where the manufacturer, or a device operated by the manufacturer, signs a verification datum, such as a public key, generated using the device-specific secret. Digital signature of manufacturer may be any digital signature as described above. As a result, a verification datum signed by manufacturer may be linked to secure proofs generated by device identifier using device-specific secret, such that manufacturer signature identifies secure computing module 116. In an embodiment, link of the manufacturer signature to device-specific secret may be used to verify authenticity of the software monitor by authentic signature of the device and cryptographic proof of construction of the software monitor Still viewing FIG. 1, in an embodiment a first core of a processor may be initialized; other cores may wait on interrupt from the first core. In an exemplary sequence, upon initialization of a first core, a cryptographic measurement root code may be booted from resistant hardware, such as, without limitation, on-chip read-only memory (ROM), and/or other hardcoded memory or circuitry. Software monitor may subsequently be loaded into memory from at least a non-volatile programmable memory. In an embodiment, all other memory address space may be cleared, zeroed, and/or set to a uniform value to achieve a known initial state. Continuing the illustrative example, at secure computing module 116 and/or a component thereof may generate device-specific secret; alternatively, a pre-shared secret may be loaded from protected memory, such as without limitation on-chip ROM, XOM, hardcoded circuitry, or the like. Further continuing the illustrative example, software monitor may be processed via a one-way cryptographic hash function as described above; an output of cryptographic hash function may be input to a key derivation function (KDF) along with device-specific secret, secure proof derived from device-specific secret, and/or verification datum derived from device-specific secret to generate software monitor public/private key pair. Cryptographic measurement root code may configure selection device 104 to sign software monitor public key and/or hash of the software monitor using device private key, and/or to cause device identifier to create a secure proof signing software monitor public key and/or hash of software monitor, establishing an attestation certificate of the software monitor. As noted above, measurement root may include dedicated circuitry that configures a computing device and/or secure computing module 116 to check the authenticity of the software monitor; for instance, the measurement root may generate an at least a first attestation key pair and sign the software monitor's public key with the processor's key system as described above.

Still referring to FIG. 1, examples of secure computing module 116s may include, without limitation, a TPM 120 as described above. Secure computing module 116 may include a TPM 120 combined with a boot-measuring protocol using hash trees, Merkle trees, or the like to measure boot entries to create an "attested boot." Secure computing module 116 may include a trusted execution technology (TXT) module combining TPM 120 with establishment of a secure container at run-time; secure container may be isolated from a software stack and OS of at least a temporal attester 104 and/or use TPM 120 to measure and attest to secure container prior to launch. Secure computing module 116 may include execute-only memory (XOM). Secure computing module 116 may include an Aegis processor. Secure computing module 116 may include a Bastion processor.

Secure computing module 116 may implement a trusted enclave, also known as a trusted execution environment (TEE). In an embodiment, a trusted enclave may be a portion of a computing device that is isolated from the main processor of the computing device. Isolation may be achieved using elements of secure computing module 108 as described above, including isolation of memory. Isolation of memory may be achieved through any process or architecture as described above for secure memory, including encryption using a cryptographic system a decryption and/or encryption key to which a secure processor or TPM has access, but to which a CPU or other main processor, as well as input/output devices or connections, does not and/or use of dedicated cache lines or the like to physically separate memory accessible to secure computing module 116 from CPU and/or input/output devices or connections. Inputs and outputs to and from trusted enclave may be restricted and controlled tightly by a secure processor and/or TPM as described above. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. RISC V architecture, including without limitation sanctum processors, Ascend secure infrastructure, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., and/or any other suitable architecture. Persons skilled in the art, upon reviewing the entirety of this disclosure, will be aware of various additional or alternative trusted computing processes that may be used to implement secure computing module 116, TEE, or trusted enclaves as disclosed herein. System 100 may incorporate or communicate with a certificate authority, which may include any certificate authority and/or version thereof as described in this disclosure.

Figure 2:
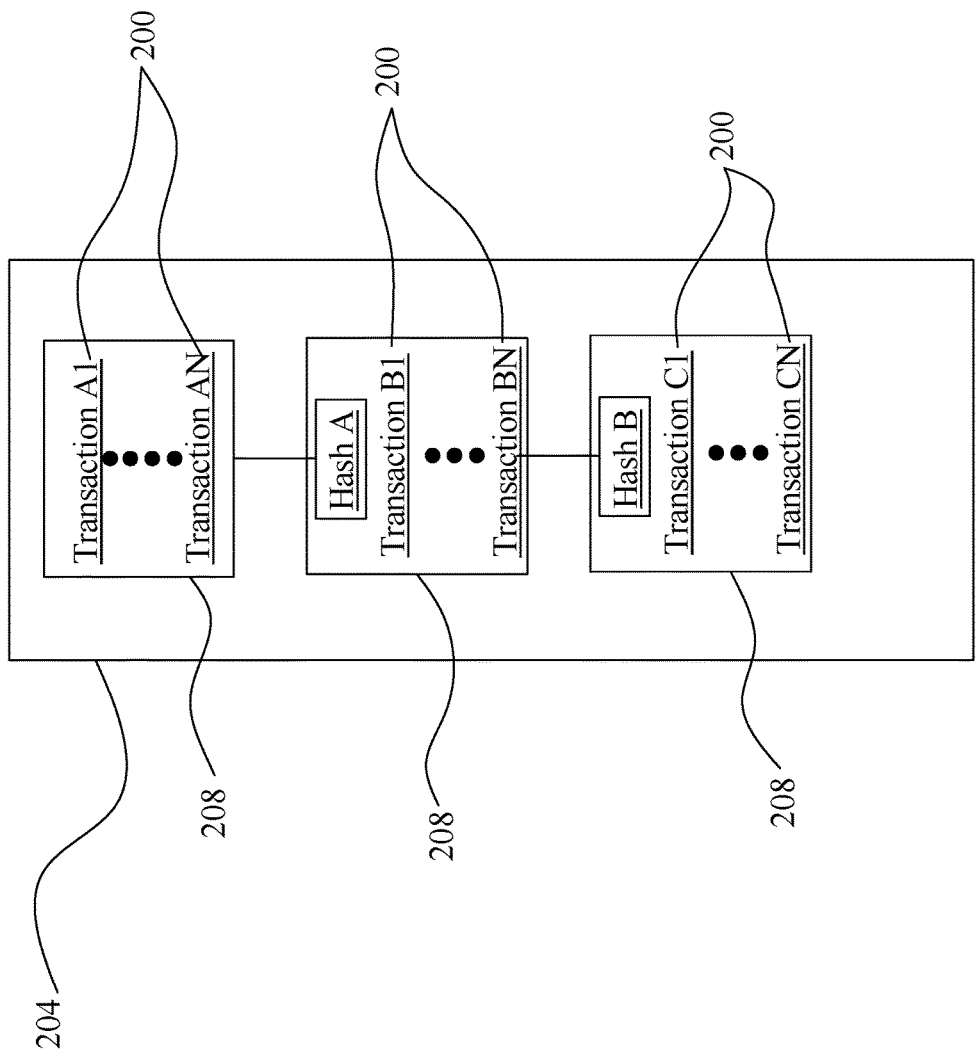
FIG. 2 is a block diagram of an exemplary embodiment of a secure listing.

Referring now to FIG. 2, system 100 may be used to perform one or more processing steps necessary to create, maintain, and/or authenticate a digitally signed assertion 200. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. Digitally signed assertion may include, be included in, and/or sign any other element of data, including authentication data, data indicating, transferring, and/or containing any credential as described herein, data containing, linking to, and/or contained in an authentication token as described herein, data identifying, linked to, and/or including all or a portion of an attestation chain, etc. Digitally signed assertion 200 may include, be included in, and/or sign an authorization token, which may include any authorization token as described in U.S. Nonprovisional application Ser. No. 16/681,750. Authorization token may be implemented as and/or include a security assertion markup language (SAML) token. Authorization token may be stored as and/or include information stored as and/or according to an attribute-based credential (ABC) and/or a plurality thereof, including without limitation privacy-preserving ABC. Tokens, digitally signed assertions, chains of attestation, and/or any other authentication and/or authorization decisions and/or other data and/or data structures evaluated and/or created according to any process described in this disclosure may be stored in and/or indexed by a library, which any device participating in and/or performing any action described in this disclosure may utilize to verify authentication, authorization, identification, attributes, capabilities, chains of trust, and/or attestation chains.

Still referring to FIG. 2, a digitally signed assertion may include an attestation conferring proof of endorsement by a third party conferring a confidence level, level of access, authorization token, which may be any authorization token as described in this disclosure, and/or demonstration of identity and/or membership in a group of devices or entities on a device that signed the first digitally signed assertion; a device that signed digitally signed assertion may be a device directly or indirectly transmitting digitally signed assertion. A third party may, for instance, have signed a verification datum linked to digital signature of a digitally signed assertion; the digitally signed assertion may be signed using hardware of signing device, for instance as performed in DAA or related protocols, and/or may be a delegatable credential in a chain of attestation from third party. A third party may include, without limitation, a verified device as described above, a manufacturer of signing device, and/or other trusted device and/or device operated by a trusted entity. First digitally signed assertion may include proof and/or endorsement by third party of various attributes of signing device, including without limitation build version, firmware version, a lot of secure computing modules to which device belongs, or the like.

Continuing to refer to FIG. 2, a digitally signed assertion and/or credential included therein and/or therewith may sign, be included in, be included with, and/or include a confidence level. A confidence level may be determined as part of, and or may include, applying at least a policy to the digitally signed assertion; at least a policy may be applied by any device as described herein. At least a policy may include instructions and/or commands to perform any confidence level determination, authentication, and/or evaluation as described in this disclosure and/or any disclosure incorporated by reference herein, and/or any combination thereof; application of at least a policy may include performance of any confidence level determination, authentication, and/or evaluation as described in this disclosure and/or any disclosure incorporated by reference herein, and/or any combination thereof. At least a policy may be stored in any suitable form including without limitation in the form of NIST Next Generation Access Control (NGAC) policies or similar policies.

In an embodiment, and still referring to FIG. 2, a collection of textual data may state that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a remote device as described in further detail below.

With continued reference to FIG. 2, at least a digitally signed assertion 200 may be included in a secure listing 204. A "secure listing," as used in this disclosure, is a data structure including digitally signed assertions 200, credentials, and/or authentication tokens, where "including" an element of data signifies containing the element itself and/or a representation thereof such as a cryptographic hash, Merkle root, or the like, such that inclusion or "membership" in the secure listing 204 can be proven. Membership in the secure listing 204 may be revoked, in non-limiting example a secure listing 204 may define the set of non-revoked members within a given temporal epoch. In non-limiting example, Membership may be proven by demonstrating that a member is not on a revocation list by means of secure proof or any method known to those skilled in the art. A secure listing 204 may include a cryptographic accumulator. A "cryptographic accumulator," as used in this disclosure, is a data structure created by relating a commitment, which may be smaller amount of data that may be referred to as an "accumulator" and/or "root," to a set of elements, which may include without limitation textual elements, authentication tokens, digitally signed assertions, and/or credentials, together with membership and/or non-membership proofs for any element in the set. In an embodiment, these proofs may be publicly verifiable against the commitment. A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. For instance, a cryptographic accumulator may be implemented as a Merkle tree and/or hash tree, in which each accumulated element created by cryptographically hashing a lot of data. Two or more accumulated elements may be hashed together in a further cryptographic hashing process to produce a node element; a plurality of node elements may be hashed together to form parent nodes, and ultimately a set of nodes may be combined and cryptographically hashed to form root. Contents of root may thus be determined by contents of nodes used to generate root, and consequently by contents of accumulated elements, which are determined by contents of lots used to generate accumulated elements. As a result of collision resistance and avalanche effects of hashing algorithms, any change in any lot, accumulated element, and/or node is virtually certain to cause a change in root; thus, it may be computationally infeasible to modify any element of Merkle and/or hash tree without the modification being detectable as generating a different root. In an embodiment, any accumulated element and/or all intervening between accumulated element and root 308 may be made available without revealing anything about a lot of data used to generate accumulated element.

Continuing to refer to FIG. 2, a secure listing 204 may include a zero-knowledge set. A "zero-knowledge set," as defined in this disclosure, is a set of elements of textual data such as strings, to which a prover may commit such that after commitment the prover can prove, for any textual datum, whether the textual datum is or is not in the set without revealing any knowledge about the set and/or any element thereof beyond the verity of such membership assertions.

Continuing to refer to FIG. 2, a secure listing 204 may include a range proof, defined for purposes of this disclosure as a set-membership proof with respect to a set that is a sequence of values on a range between upper and lower bounds, such as an open or closed set on the real number line or the like.

Secure listing 204 may include a temporally sequential listing, which may include any set of data used to record a series of at least a digitally signed assertion 200 in an inalterable format that permits authentication of such at least a digitally signed assertion 200. In some embodiments, secure listing 204 records a series of at least a digitally signed assertion 200 in a way that preserves the order in which the at least a digitally signed assertion 200 took place. Secure listing may be accessible at any of various security settings; for instance, and without limitation, secure listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, secure listing 204 may preserve the order in which the at least a digitally signed assertion 200 took place by listing them in chronological order; alternatively or additionally, secure listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. In an embodiment, the secure listing may be a directed acyclic graph (DAG), in which multiple branches may be generated on or by different devices implementing secure listing 204, and branches may be merged into one another, while a hash chain or similar structure ensures that branches cannot go "back in time" whether merged or not; secure timestamps and/or attested time may be further included to impose a temporal order on a DAG or other secure listing 204. The ledger may preserve the order in which at least a digitally signed assertion 200 took place by listing them in sub-listings 208 and placing the sub-listings 208 in chronological order. The secure listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger, but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Secure listing 204 may be incorporated in, stored in, or incorporate, any suitable data structure, including without limitation any database, datastore, file structure, distributed hash table, or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, secure listing 204, once formed, cannot be altered by any party, no matter what access rights that party possesses. For instance, secure listing 204 may include a hash chain, in which data is added during a successive hashing process to ensure non-repudiation. Secure listing 204 may include a block chain. In one embodiment, a block chain is secure listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order, and links each sub-listing 208 to a previous sub-listing 208 in the chronological order, so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208 In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the secure listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208 The incentive may be financial; for instance, successfully mining a new sub-listing 208 may result in the person or entity that mines the sub-listing 208 receiving a predetermined amount of currency. The currency may be fiat currency. Currency may be crypto-currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in secure listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, secure listing 204 may develop a fork; protocol may determine which of the two alternate branches in the fork is the valid new portion of the secure listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer secure listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the secure listing 204.

Still referring to FIG. 2, additional data linked to at least a digitally signed assertion 200 may be incorporated in sub-listings 208 in the secure listing 204; for instance, data may be incorporated in one or more fields recognized by block chain protocols that permit a person or computer forming a at least a digitally signed assertion 200 to insert additional data in the secure listing 204. In some embodiments, additional data is incorporated in an unspendable at least a digitally signed assertion 200 field. For instance, the data may be incorporated in an OP RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a remote device, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the remote device) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 5. For example, and without limitation, at least a digitally signed assertion 200 may include one or more encrypted or otherwise secured or partitioned memory entries as entered for instance using a secure computing module 116 or according to a secure computing protocol as described in further detail below.

Referring again to FIG. 1, in some embodiments, secure computing module 116 and/or remote device may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing module 116s, man in the middle or other attacks.

Figure 3:
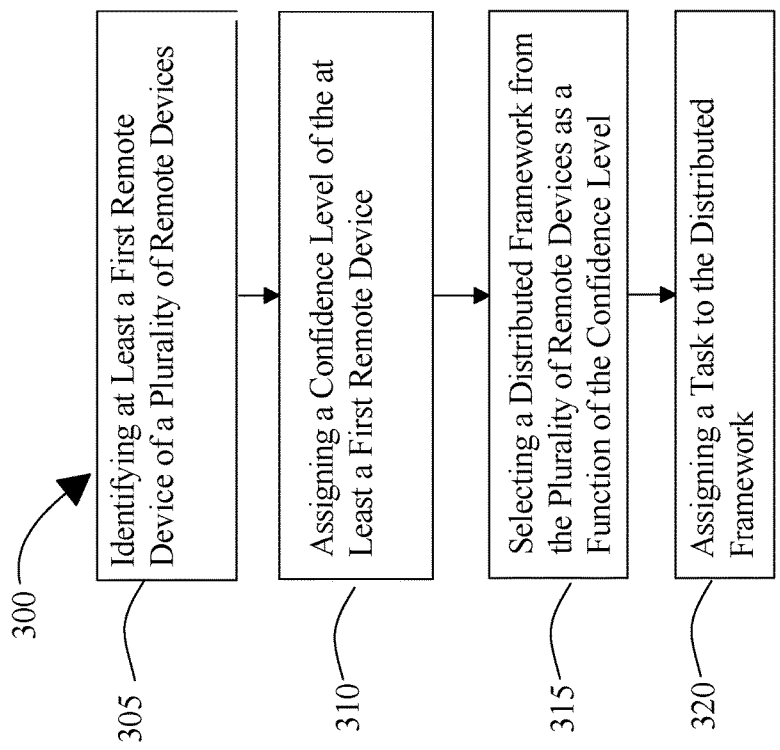
FIG. 3 illustrates particular implementations of various steps of a method of selecting a distributed framework.

Referring now to FIG. 3, an exemplary embodiment of a method 300 of selecting a distributed framework is illustrated. At step 305, selection device 104 identifies at least a first remote device of a plurality of remote devices 112. Identifying may include, as a non-limiting example, comparing at least a datum received as an identifier from at least a first remote device to one or more stored values; one or more stored values may be stored in a secure listing as described above. One or more stored values may be stored in a database or other data structure. Identifying may include comparison of a digitally signed assertion and/or secure proof, as described in further detail below, in a secure listing or other data structure to a digitally signed assertion and/or secure proof received from at least a first remote device.

Still referring to FIG. 3, identifying the at least a first remote device may include evaluating a secure proof generated by the at least a first remote device and identifying the at least a first remote device as a function of the secure proof. Secure proof may include any secure proof as described above including without limitation a secure proof demonstrating possession of a secret stored in or produced by secure computing module 116 and/or PUF 124. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange.

With continued reference to FIG. 3, secure proof may include a digital signature. In an embodiment, digital signature may be any digital signature as described above; digital signature may be created by signing a mathematical representation of first dataset. In an embodiment, at least a first remote device may generate a key to be used in producing digital signature using secure computing module 116. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a first remote device and/or secure computing module 116 may convert immediate output from PUF 124 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a first remote device and/or secure computing module 116 may extract one or more random numbers based on a PUF 124 output to create a symmetric key as described above. Alternatively or additionally, extraction may include extraction of a private key of a public key cryptographic system.

Still referring to FIG. 3, key extraction may include use of a number output by a PUF 124 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 124; steps along a chosen elliptic curve may then be performed using random number to generate a public key. Initial point on elliptic curve and elliptic curve may be selected using a additional random numbers, which may be generated using any suitable method; random numbers associated with curves having known vulnerabilities may be discarded, according to mathematical descriptors or other characteristics of such vulnerabilities as stored in memory of or accessible to at least a first remote device and/or secure computing module 116. Persons skilled in the art, upon reading the entirety of this disclosure, will be aware of various ways in which a random number may be used to generate a private and public key pair consistently with this disclosure.

Still viewing FIG. 3, Key extraction may utilize a numerical output from a PUF 124 or other element of secure computing module 116 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 124 and/or elements of secure computing module 116 may generate one or more random numbers, for instance by using one or more PUFs as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 3, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 116 may act as a "first signer" of a digital signature, signing with a private key produced from a secret generator module as described above, which may be a group key. In an embodiment Secure computing module 116 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by Secure computing module 116 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verifying nodes, or the like.

Still referring to FIG. 3, secure proof may include be generated using a physically unclonable function. For instance, and without limitation, an output of a PUF 124 may be used to generate a private key for a digital signature as described above. Alternatively or additionally, a PUF 124 output may constitute a secret to be used as a basis for a zero-knowledge proof, which may be any zero-knowledge proof as described herein.

Still referring to FIG. 3, secure computing module 116 and/or at least a first remote device may generate one or more elements of additional information that user or device may use to evaluate secure proof. For instance, secure computing module 116 and/or at least a first remote device may generate a public key; public key may be provided automatically to any querying device. Alternatively or additionally, public key may be provided to a manufacturer of secure computing module 116, permitting manufacturer to act as a certificate authority for secure computing module 116. Similarly, secure computing module 116 and/or at least a first remote device may generate data necessary to perform verification of a zero-knowledge proof by any verifier as described above.

With continued reference to FIG. 3, evaluating the secure proof may include receiving a verification datum corresponding to secure proof and evaluating the secure proof as a function of the verification datum. Verification datum, as used herein, is any datum that may be used to aid in evaluation of secure proof; for instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof.

In an embodiment, and still viewing FIG. 3, identifying the at least a first remote device may include identifying a first remote device using a first identification protocol and identifying a second remote device using a second identification protocol, wherein the first identification protocol is distinct from the second identification protocol. As a non-limiting example, a first remote device of at least a first remote device may be identified using a TTP protocol, while a second may be identified using a DAA protocol. As a further example, a first remote device may be identified using a first version of a secure computing module 116 incorporated in the first remote device, while a second remote device may be identified using a second version of a secure computing module 116; the first version may, for instance, be a GhostRider implementation while the second is an SGX implementation, or the like. In an embodiment, identification of remote devices using heterogenous methods decreases the likelihood of an exploit successfully compromising all evaluators, as such an exploit would be required to take advantage of a potentially wide range of different vulnerabilities. Furthermore, in an embodiment selection device 104 may perform a time-of-evaluation selection of identification protocols, for instance by selecting from a stored menu of protocols using a random number generator or pseudorandom number generator; this may further decrease the probability of a successful exploit.

At step 310, and with continued reference to FIG. 3, selection device determines a confidence level of the at least a first remote device. At least a confidence level may include a single confidence level assigned to a single remote device, a plurality of confidence levels assigned to a plurality of remote devices, an aggregate confidence level of a plurality of remote devices, or any other single or plural confidence level as described herein. Assigning a confidence level may include evaluating at least a digitally signed assertion signed by a remote device of the at least a first remote device, and assigning a confidence level to the remote device as a function of the evaluation of the at least a digitally signed assertion. At least a digitally signed assertion may be identified as signed by at least a first remote device using any identification process or protocol as described above. In an embodiment, at least a digitally signed assertion may be incorporated in a secure listing of digitally signed assertions. For instance, where secure listing is a blockchain or similar data structure, each assertion may be included in the blockchain. At least a second digitally signed assertion may include a plurality of digitally signed assertions. For instance, at least a first remote device may record a series of digitally signed assertions in secure listing; each transaction of the series of transactions may be authenticated by any process suitable for authenticating secure listing, including any process described herein for authentication of secure listing. As a further non-limiting example, at least a first remote device may enter an initial digitally signed assertion attesting to one or more elements of identification and/or authentication, including without limitation attestation of manufacturing date of at least a first remote device and/or secure computing module 116, identities, serial numbers, versions, or make of hardware components of at least a first remote device and/or secure computing module 116, or the like. Transactions performed by at least a remote device may be scored according to authenticity; for instance, trusted status may be conferred on at least a remote device only if a certain number of authenticated transactions have been performed by at least a remote device, a certain amount of value has been conveyed in authenticated transactions by at least a node, a certain proportion (which may be 100%) of transactions performed by at least a remote device have been successfully authenticated, or any other suitable benchmarking and/or scoring process or combination thereof. At least a digitally signed assertion may include assertions that were recorded in rejected instances of a secure listing 204, such as rejected forks; in an embodiment, confidence level may be reduced as a function of a number of rejected forks including assertions signed by at least a remote device, for instance.

Still referring to FIG. 3, assigning the at least a confidence level may include receiving a consensus evaluation of the at least a confidence level from a network of remote devices. for instance, all remote devices currently connected to network may determine a confidence level concerning a particular remote device. This determination may be performed, for instance, by authenticating one or more current or past instances of a secure listing 204 and/or one or more sub-listings 208 thereof. Determination may include identification of one or more rejected instances of secure listing 204. Each remote device of plurality of remote devices may provide a confidence level for the remote device to be evaluated. Selection device 104 and/or another processor communicatively coupled to network may calculate an aggregate confidence level based on confidence levels submitted by plurality of remote devices; aggregation may be performed according to any method for aggregation of confidence levels described above. In an embodiment, aggregation may be weighted according to a previously determined confidence level of each remote device of plurality of remote devices performing consensus determination of confidence level of remote device to be evaluated. This may include, e.g., ignoring confidence level submissions from evaluators having confidence levels below a certain threshold; alternatively or additionally, selection device 104 may request confidence level determinations by a plurality of evaluators previously determined to have a confidence level above a certain threshold level. Each remote device and/or other processor participating in consensus determination of confidence level may perform any action described herein for determining a confidence level, or any combination of such actions.

With continued reference to FIG. 3, assigning the at least a confidence level may include evaluating a digitally signed assertion assigning a recorded confidence level to a remote device of the at least a first remote device, and assigning the confidence level as a function of the recorded confidence level. Digitally signed assertion may be any digitally signed assertion as described herein. Digitally signed assertion may be included in any secure listing as described herein; secure listing may include a secure listing relating identifiers of remote devices to confidence levels, where identifiers may be any data usable as identifiers as described herein. Assignment of confidence level may be performed as a function of identifier; that is, identifier may be linked to an identity of a remote device, which may be used for assignment of confidence level as described in this disclosure. Selection device 104 may receive an instance of secure listing; receiving may include receiving an entire copy of the instance, receiving a sub-listing, receiving a link to secure listing, or a portion thereof, stored remotely, receiving digitally signed assertion along with an indication of secure listing containing digitally signed assertion, or the like. As a non-limiting example, one or more processors, a consensus process, selection device 104, and/or a network of remote devices having a confidence level in excess of a threshold, may have previously evaluated a confidence level in a certain remote device; in an embodiment, such a confidence level may itself be recorded in an assertion listed in secure listing 204. A plurality of such assertions, corresponding to a plurality of remote devices, may be listed; as such, selection device 104 may determine confidence level in one or more remote devices solely by retrieving confidence levels so recorded. Alternatively or additionally, selection device 104 may combine such confidence levels with confidence level determinations made by other means. Combination may be performed, e.g., by retrieving such confidence levels from secure listing 204 for at least a first remote device, and calculating a confidence level for at least a second remote device by any other process described above. As a further example, selection device 104 may retrieve a confidence level recorded in secure listing 204 for a given remote device, determine a confidence level for the same remote device, and then aggregate the two confidence levels according to any process as described above for aggregation of confidence levels. Selection device 104 may determine confidence level using an algorithm assessing a number of connections from one device to another, such as without limitation a number of references to first remote device by other remote devices in hypertext markup language (HTML) files or the like.

Still referring to FIG. 3, selection device 104 may further weight or modify confidence level according to one or more additional factors. For instance, confidence level may be weighted according to how recently remote device signed a digitally signed assertion in an authenticated instance of secure listing 204, where a more recently authenticated assertion may result in a higher confidence level or higher weight assigned to the confidence level, and a less recently authenticated assertion may result in a lower confidence level or a lower weight assigned to that confidence level. As another example a remote device that has recently "sold off" a large amount of value and/or has an assertion in a sub-listing 208 currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

With continued reference to FIG. 3, assigning the at least a confidence level may include performing a trusted time evaluation of at least an action performed by the at least a first remote device. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via decentralized anonymous attestation (DAA)) to verify that the secure computing module 116 is an authentic secure computing module 116 that has the property of attested time. Attested time may be implemented, without limitation, as described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference.

With continued reference to FIG. 3, secure timestamp may be recorded the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 116. Additional data may include one or more additional data, including sensor data or a hash of data, that are received or generated by temporal attester 104. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other remote devices may evaluate confidence levels in at least a first remote device or other party generating secure timestamp and/or perform threshold cryptography with a plurality of such parties, each of which may have performed an embodiment of method to produce a secure timestamp. In an embodiment, remote devices or other parties authenticating first digitally signed assertion 200 may perform authentication at least in part by evaluating timeliness of entry and/or generation of first digitally signed assertion 200 as assessed against secure timestamp. In an embodiment, secure proof is generated using an attested computing protocol; this may be performed, as a non-limiting example, using any protocol for attested computing as described above.

Still referring to FIG. 3, selection device 104 may determine a confidence level in an identity of the at least a first remote device; assigning the at least a confidence level may include assigning the at least a confidence level as a function of the at least a confidence level in the identity. Confidence level in identity may be computed, for instance, using one or more statistical measures of reliability of the identification method used; for instance, a user may enter an instruction on selection device 104 providing statistics indicating success rates of various identification methods. Statistics may be collected based, as a non-limiting example, on discoveries of vulnerabilities in particular identification protocols and/or particular instances of secure computation module. User may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise assigning a confidence level as a function of the confidence level in the identity. Selection device 104 may also determine confidence level in identity as a function of, for instance, one or more algorithms collecting statistics concerning degree of accuracy in past iterations of method 400 of a particular process for identifying at least a remote device.

At step 315, and still referring to FIG. 3, selection device 104 selects a distributed framework from plurality of remote devices as a function of the at least a confidence level. A distributed framework, as used herein, is a network containing one or more computing devices amongst which computational and/or data storage tasks are distributed, including without limitation computational tasks and/or data storage tasks as disclosed in further detail herein. Distributed framework may enable a device calling upon distributed framework, including without limitation selection device 104, to treat one or more network-connected devices assembled in the distributed framework as a single device or pool that performs computational and/or storage tasks. Distributed framework may be use any suitable protocol for such task distribution, including without limitation any protocol and/or protocols as described herein, the Message Passing Interface (MPI) protocol, the HADOOP protocol promulgated by the Apache Software Foundation of Wakefield, Mass., and or the SPARK protocol promulgated by the Apache Software Foundation. Selecting distributed framework may include selecting a distributed framework including at least a first remote device. Distributed framework may include solely the at least a first remote device; for instance, selection device 104 may select one or more remote devices having confidence levels recorded in secure listing, and select the one or more remote devices as the distributed framework. Alternatively or additionally, one or more remote devices and/or other devices may be selected for distributed framework by at least a first remote device and/or using first remote device as a reference point.

Still referring to FIG. 3, selections of devices for distributed framework may be determined according to proximity according one or more measures of distance or time between each remote device and selection device 104, between at least a first remote device and each selected remote device, and/or between at least a first remote device and selection device 104. For instance, and without limitation, where the plurality of remote devices is connected to the selection device via a network, selecting the distributed framework further comprises selecting at least a proximate remote device of the plurality of remote devices in a graph representing the network; a proximate at least a remote device on a graph, may include, for instance, a at least a remote device within a certain number of steps through the graph from the once device to another. Steps may also be weighted according to, e.g., estimates of physical distance or length of wire between remote devices 112 connected by steps, as measured using network latency analysis and/or other processes for instance as described below. As another non-limiting example, selecting the distributed framework may include selecting at least a geographically proximate remote device of the plurality of remote devices. Geographical location of selection device 104, at least a first remote device and/or at least a device selected as part of distributed framework may be performed by analysis of IP addresses, which may be compared to stored information mapping such addresses to particular geographical locations or the like; geographical location of any devices as described above may alternatively or additionally be determined using navigational facilities, such as the global positioning system (GPS) or other protocols used to determine the location of a device. Distance between devices may be computed using this information and compared to a threshold value; a device may be selected only if distance from selection device 104 and/or at least a first remote device is below the threshold value, which may include, for instance, a radius of a certain number of miles or kilometers around the determined location of the selection device 104, at least a first remote device, and/or another device.

With continued reference to FIG. 3, selecting the distributed framework may include selecting at least a temporally proximate remote device; this may be at least a remote device that under network latency analysis, time for response to a "ping" signal, or the like presents a likelihood of a more rapid response. Alternatively or additionally, past response times and/or past times in which generation of appraisals as described in further detail below was performed may be recorded in memory 108 and/or in secure listing 204; selection of at least a remote device may be performed based on past performance time. Selection of distribute framework may include selection of at least a device to minimize total communication latency, where total communication latency is total expected time for each remote device, or other device, to respond with an appraisal as described in further detail below; such selection may involve determining, for instance, a selection of plurality of remote devices 112 presenting an optimal or near-optimal network traversal time, which may be computed using node-count distances, geographical distances, network communication latency times, and/or expected performance times by particular remote devices 112. Such optimization may involve a near-optimal resolution of a "traveling salesman" problem, including without limitation a "greedy algorithm" in which each selection step involves choosing a locally optimal remote device 112; for instance, selection device 104 may choose a first "nearest" remote device 112 as measured by any of the above metrics, including any measure of actual or path distance and/or any measure of communication or computation latency. Continuing the example, selection device 104 may subsequently select a second remote device according to a locally optimal next selection under the above-described metric or metrics, selecting from locally optimal steps that either at least a first remote device, selection device 104, either, or both may perform. This may be repeated until a desired number of remote devices 112 is selected; "desired" number may be a raw threshold number, an aggregate confidence level as described in further detail below, or the solution to another optimization problem such as optimization of confidence versus speed as described in further detail below. Alternatively or additionally, optimal selection may make use of data concerning previously performed transactions; use of such data may include selection of an acceptably rapid previous transaction, or use of a plurality of previous selections to produce an algorithmic or mathematical solution to optimal selection using, e.g. a polynomial regression process, a neural-net machine learning process, or the like. Persons skilled in the art will be aware of various machine learning, deep learning, or other adaptive techniques that may be used to approach such an optimization problem, upon reviewing the entirety of this disclosure.

Still referring to FIG. 3, selection may include selection of only highly trusted remote devices, for instance as determined by determination of confidence levels as described below, such that the fewest remote devices are required for a given security requirement. These methods may be used to optimize network performance of authentication processes. In another example, additional data as described above that are incorporated into blocks or otherwise made available to nodes of the network may be utilized to optimally select which remote devices are selected.

In another embodiment, and continuing to refer to FIG. 3, selecting distributed framework may include establishing an aggregate confidence-level threshold determining confidence levels of one or more remote devices of the plurality of remote devices, and/or of one or more other devices that may be incorporated in distributed framework, aggregating the confidence levels of the one or more remote devices to generate an aggregate confidence level, determining that the aggregate confidence level satisfies the aggregate confidence-level threshold, and selecting the one or more remote devices. Evaluation of confidence level of each of the plurality of remote devices may be performed as described in further detail herein. Establishment of an aggregate confidence level in a plurality of remote devices 112 or other devices having a plurality of associated confidence levels may involve, e.g., adding together confidence levels; alternatively, aggregate confidence level may be computed by viewing each confidence level as a probability, calculating an aggregate probability by averaging or other statistical combination processes, and selecting remote devices 112 or other devices so as to result in an aggregate probability representing a desired confidence level. Alternatively or additionally, a machine-learning algorithm as described above may analyze past transactions to determine an optimal mathematical operation for calculating an aggregate confidence level. As noted below, a desired confidence level to be used as a threshold may be computed in turn by reference to a user input indicating a desired confidence level, a minimal confidence level set by selection device 104 and/or network, for instance to ensure some degree of overall network integrity, a calculation based on a value of a transaction recorded in at least a digitally signed assertion 116, or the like.

Still referring to FIG. 3, selecting the distributed framework may include generating a cost function of confidence level and communication latency and minimizing the cost function. In an embodiment, cost function may be selected to optimize one or more user and/or network goals. Goals to be optimized may include, without limitation, a desired degree of latency (defined herein as a speed with which at least a computational or storage task to be performed by distributed framework occurs), security (which may be defined, e.g., as a degree of confidence in the accuracy of the task, a degree of confidence in the data integrity of the task, a degree of confidence in protection from data breeches and/or theft of information, and/or a degree of confidence in faithful performance of the computation by distributed framework), anonymity (defined as a degree of difficulty in obtaining information concerning a user of querying device and/or a person entering a transaction on secure listing 204), and throughput (defined as an aggregate or average latency across users, remote devices, and or other devices). There may be tradeoffs between the above-mentioned four goals. For instance, if user wishes to perform a task rapidly, reducing the number of nodes in at least a highly trusted at least a remote device may improve the speed with which authentication can take place, as may selection of proximate nodes as described above. Anonymity, however, may favor selection of more widely scattered remote devices or other devices to make it more difficult to deduce where selection device 104 is located geographically or within network; additional measures to ensure anonymity, such as use of an anonymizing protocol such as the Tor protocol promulgated by The Tor Project, Inc., which functions by directing all internet traffic through a network containing a plurality of relays to conceal a user's location and usage from network surveillance and/or traffic analysis attempts, using "onion routing" processes, or the like may further increase latency and slow down authentication. Similarly, where greater security is a goal selections a highly trusted devices may be maximized, and/or across a wider range of network locations and/or geographical locations to improve the likely independence of nodes, also slowing the process. Selection of greater numbers of nodes, with lesser network latency between them, may also enable greater performance or capacity in computational or storage tasks. Thus, a person or device who wants to perform a task very secretly may desire a very high degree of security and anonymity, and may accept a greater degree of latency in exchange. A user or device seeking to perform a task with a high degree of security, but without a need for rapid performance or storage capacity may use a small number of highly trusted nodes. As another non-limiting example, a task may require fast, high-security, processing, relying on high degree of trust and low anonymity. As a further example, processes involving medical data may require high anonymity and high security, which may be emphasized above speed. In an embodiment, the ability of method 300 or variations thereof to modify these parameters for optimal results in different scenarios may be highly advantageous over existing methods.

With continued reference to FIG. 3, cost function may be dynamically set by a selected degree of optimization for one or more attributes. Determining degree of optimization may be performed via a user interface, which may be a graphical user interface (GUI), for instance by providing a user with one or more sliders representing desired degrees of security, transaction speeds, and/or levels of anonymity; sliders may be linked to absolute ranges of the attributes or may alternatively be used proportionally to represent relative importance to user of each attribute. Positions of one or more sliders may be reset according to stored mathematical relationships between different items; mathematical relationships may be determined by combining or producing machine-learning processes. A related or separate set of mathematical relationships may be used to determine how selection of at least a highly trusted at least a remote device affects each attribute. Protocol implemented in embodiments herein may support varying security and anonymity demands by the parties to the transactions. For instance, two parties wishing to exchange $5M over the network will demand commensurate security and require some reduction in anonymity to comply with federal laws, in exchange for slightly longer validation times. Conversely, a customer purchasing a coffee at Starbucks will demand relatively little security and may be fully anonymous; a potential malicious actor utilizing a great number of small transactions to hide a large total transaction from regulators may be thwarted by identifying anonymous certificates that are re-used above some threshold and flagged by the network. This may allow network to self-adapt to meet varying demands.

With continued reference to FIG. 3, mathematical relationships between attributes and each other and/or between attributes and selection of distributed framework may be derived by collection of statistics concerning past transactions. In some embodiments, statistical relationships are determined through one or more machine learning processes; for instance, data describing the speed, authenticity, and anonymity of a plurality of past transactions may be subjected to regression analysis, such as linear or polynomial regression, to determine one or more equations relating one parameter of such transactions to one or more other such parameters. Similarly, a neural net may be provided with such a plurality of past transactions. Machine-learning processes may be supervised and/or unsupervised; for instance, attributes to compare may be preselected to ensure that machine-learning processes result in relationships between desired attributes and transaction parameters. Mathematical relationships may demonstrate, e.g., that a certain number of nodes in at least a highly trusted node results in a 95% degree of confidence, that a second, higher number of nodes results in a 98% degree of confidence, and the like. As a further example, mathematical relationships may associate a level of anonymity, as measured in average proportion information content concerning user and/or selection device 104 obtainable from a transaction, information entropy of transaction, or the like, to average network or geographical distance between nodes of at least a highly trusted node, to selection of protocols to anonymize, and the like. Relationships between, the above parameters and latency may also be represented. Direct relationships between attributes to be optimized may be determined by machine learning processes; alternatively or additionally, such relationships may be determined using relationships of each attribute to parameters of selected device.

In an embodiment, and still referring to FIG. 3, selection may include assigning an authorization token granting an access right to at least a first remote device. An "authorization token" as used in this disclosure is a token granting an access right, signed by a device generating authorization token, such as without limitation selection device 104. Authorization token may include a temporal attribute. To facilitate anonymity, in an exemplary embodiment of authorization token in which it is desired to maintain anonymity of the remote device while using at least a authorization token, the at least a authorization token may contain at least one of the following attributes: a secure timestamp indicating the time that the token was created, a monotonic counter value or other datum unique to the authorization token for this particular remote device, and/or a session key conferring access to the network at the time of token creation. Additionally or separately, at least an authorization token may include an expiration period, e.g. a fixed time limit relative to the verifier's local time the token was created or issued, and may include at least a trust level based upon the properties of the remote device or other device attested in the authorization process, as described herein. It may be desirous to separately or additionally provide at least a session key enabling remote device to encrypt and/or decrypt messages to at least an additional remote device, or at least a group of remote devices, based on properties of commonality therebetween. In non-limiting example, session key may be a symmetric key conveyed via secure channel from the at least a verifier, and/or an asymmetric key, multisignature, threshold signature or key system resulting from multi-signature or threshold signature as described above, or other key system or datum associated with at least a verifier during at least a time epoch. In an embodiment, a temporal attribute associated with an authorization token may be determined and/or generated based on confidence level; for instance, a first remote device that has been assigned a first confidence level may be issued a first authorization token by selection device 104 having a first expiration period, and second remote device that has been assigned a second confidence level that is less than, or indicative of a lower degree of confidence than, first confidence level may be issued a second authorization token having a second expiration period of lesser duration than the first expiration period. In an embodiment, selection device 104 and/or any other device generating authorization tokens may re-evaluate a length of an expiration period, upon expiration of an authorization token associated with a remote device; for instance, and without limitation, selection device 104 and/or other device generating authorization tokens may perform any step described above for evaluation of confidence levels, including without limitation generating a new or updated confidence level for the remote device and/or making any determination regarding the remote device described above as usable for determination and/or assigning of a confidence level. Where a newly determined confidence level is higher or indicative of greater confidence, and/or determination results in a conclusion that would, if used in determinations of confidence level as described above, cause and/or tend toward generation of a higher confidence level, a subsequently and/or concurrently generated authorization token may have a new expiration period of longer duration, and/or may not expire at all; where a newly determined confidence level is lower or indicative of lesser confidence, and/or determination results in a conclusion that would, if used in determinations of confidence level as described above, cause and/or tend toward generation of a lower confidence level, a subsequently and/or concurrently generated authorization token may have a new expiration period of shorter duration, and/or may not be generated at all if confidence level and/or result of determination falls below a threshold as described above. Authorization tokens, temporal attributes, and/or attested time may be implemented according to any embodiments described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference.

With continued reference to FIG. 3, at least a first remote device may assist in selection of one or more additional devices, which may be remote devices of plurality of remote devices, or may be other devices connected to network. For instance, and without limitation, selecting the distributed framework may include receiving an identification of at least a second remote device of the plurality of remote devices from the at least a first remote device, and selecting the at least a second remote device as a function of the identification of the at least a second remote device. The identification of the at least a second remote device may include a digitally signed assertion generated by the at least a first remote device; digitally signed assertion may be created using any protocol for creation of a digitally signed assertion, including a digital signature signed with a private key possessed and/or generated by at least a first remote device, a secure proof, as defined above, generated according to any protocol or combination of protocols as described above by first remote device, or the like. Identification of at least a second remote device and/or other device may include verification information that may be combined with a secure proof issued by second remote device to verify or authenticate second remote device, including without limitation an address as described above, a public key as described above, a verification associated with a zero-knowledge proof, or the like. Selection device 104 may select one or more of at least a second remote device (or other device), including less than all remote devices of at least a second remote device (or other device) according to any criteria as described above for selection of at least a first remote device and/or any device included in distributed framework, including without limitation by determining confidence levels in individual devices and/or aggregate confidence levels, comparison of confidence levels to threshold values, minimization of cost functions and/or optimization of network distance or latency, or any other procedure described above.

At step 320, and still viewing FIG. 3, selection device 104 assigns a task to the distributed framework; task may include a computational task, a storage task, or any combination thereof. This may be performed in any suitable manner for division of tasks, including distributed storage using, for instance, distributed hash tables, secure listings, JAVA HDFS as promulgated by Oracle, a resilient distributed dataset, or the like. Assignment of task may be performed by partitioning or dividing data and/or computational tasks by a "master" device amongst one or more "slave" devices; "master" device may be selection device 104, a device having a high confidence level as described above, including without limitation first remote device. For instance, and without limitation, a task requiring processing of a large quantity of data, for instance sorting or searching within the data, may be divided among "slave" devices by partitioning the data into "chunks," each of which is sent to one or more distinct devices; devices may then perform local portions of the overall computing task with regard to their respective partitions, followed by a recombination of the computing outputs to produce a final result. Recombination of outputs may be performed by "master" device. Allocation of computational or data storage tasks may be performed to minimize network latency costs, which may be done using any calculations or processes to minimize latency, minimize network distance, and/or minimize geographical distance, as described above; in other words, "selection" may be performed a first time to select distributed framework, and (optionally) a second time for maximally efficient distribution of tasks.

Figure 4:
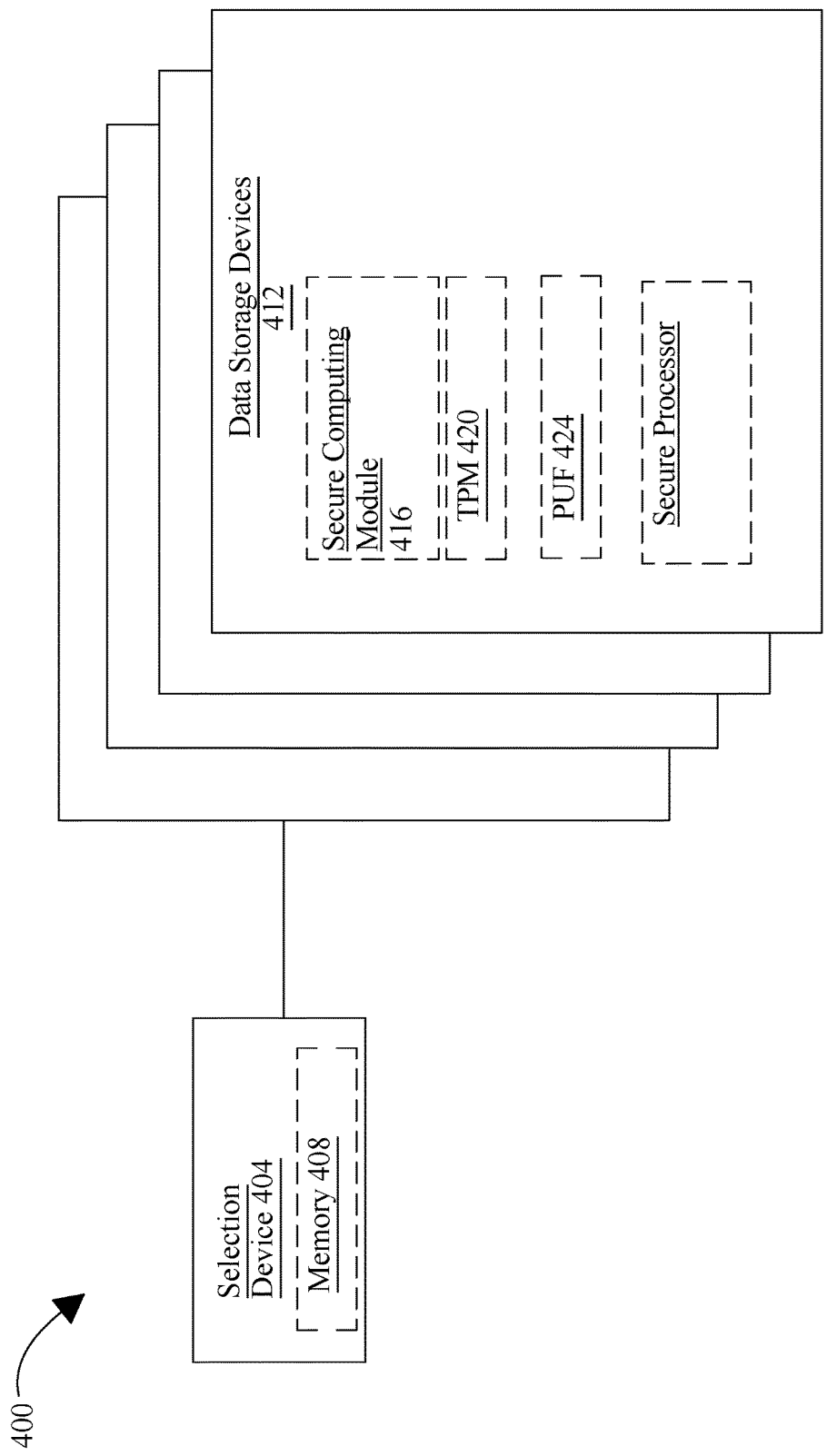
FIG. 4 is a block diagram illustrating an exemplary embodiment of a system for selecting data storage devices using machine learning.

Referring now to FIG. 4, an exemplary embodiment of a system 400 for selecting data storage devices for machine learning is illustrated. System 400 includes a selection device 404. Selection device 404 may be any selection device as described in this disclosure, including without limitation any device suitable for use as selection device 104 as described above. Selection device 404 may be included in any computing device as described in this disclosure. Selection device 104 may include a single processor operating independently, or may include two or more processors operating in concert, in parallel, sequentially or the like; two or more processors may be included together in a single computing device or in two or more computing devices. Processor may be an element of, be in communication with, or otherwise utilize a secure computing module as described below in further detail. Processor may be or include a data storage device as described below in further detail.

Selection device 404 may include in non-limiting example one or more FPGAs or other programmable logic-based hardware. In the case of programmable logic-based hardware, selection device 404 may incorporate protection mechanisms to ensure the authenticity and confidentiality of the bitstream and other configuration parameters used to set up the desired logic in the programmable logic-based hardware. These protection mechanisms may include public/private key encryption and any other approaches described below. Selection device 404 may further incorporate random number generator, true random number generator, synthesizable physically unclonable function (PUF) or such similar feature to provide a cryptographically strong seed for public/private key encryption of other methods using private keys. Attested properties as described below may in the case of programmable logic further include attestation of the authenticity and or proof of unadulterated configured logic. In a non-limiting example, selection device 404 and/or data storage device 412 may be hosted by a third party, e.g. as a "cloud service."

Still referring to FIG. 4, selection device 404 is communicatively connected to a memory 408; as used herein "communicatively connected" devices or components are devices or components capable of wired or wireless exchange of electronic data, including direct wired connection, indirect wired connection via one or more intermediate components or devices, communication via electromagnetic radiation including using an antenna, communication via optical signals, or the like. Communicatively connected devices may include two or more devices incorporated together in a computing device as described in this disclosure. Communicatively connected devices may include devices "paired" or otherwise connected using wireless transceivers. Communicatively connected devices may include devices connected using any network connection. Memory 408 may include any form of memory described in this disclosure. Memory 408 may be incorporated in a device containing selection device 404, distributed through several devices, which may contain selection device 404, or a component thereof, or in another device accessible to selection device 404 via electronic communication. Selection device 404 may be communicatively connected to a plurality of data storage devices 412. Selection device 404 may be designed and configured to perform any method step or steps as disclosed herein; as a non-limiting example, selection device 404 may be designed and configured identify at least a first data storage device of the plurality of data storage devices, determine a confidence level of the at least a first data storage device, select a distributed framework from the plurality of data storage devices as a function of the at least a first data storage device as a function of the confidence level, and assign at least a machine-learning task to the distributed framework.

Figure 5:
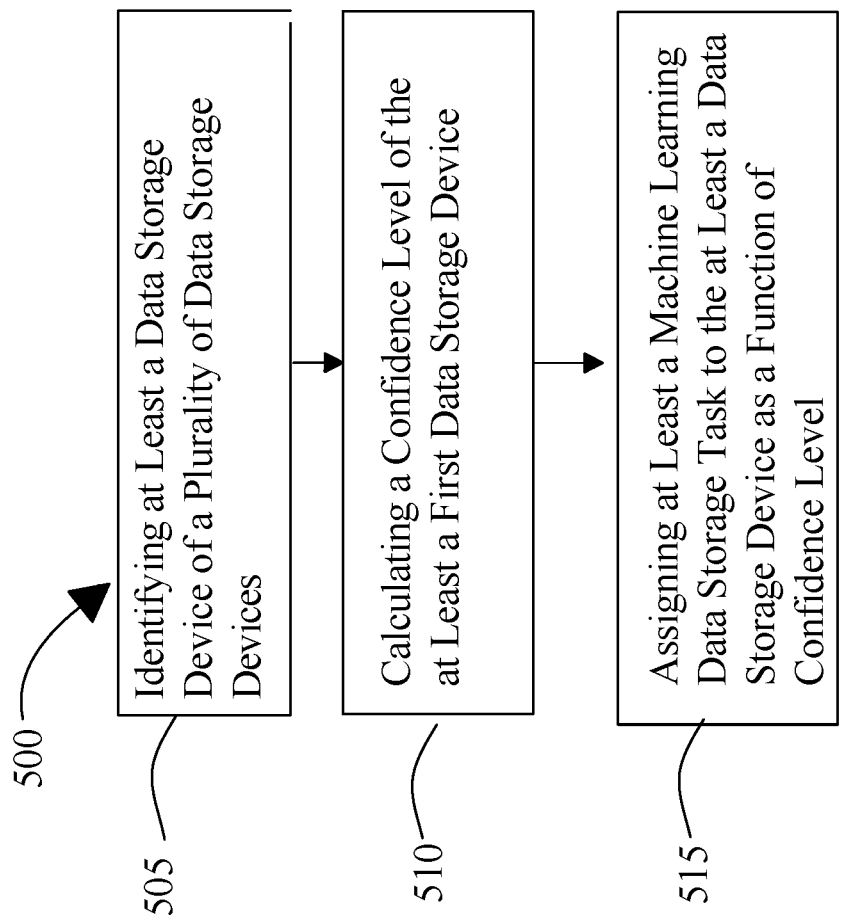
FIG. 5 illustrates particular implementations of various steps of a method of selecting data storage devices using machine learning.

Referring now to FIG. 5, an exemplary embodiment of a method 500 of selecting data storage devices for machine learning is illustrated. At step 505, selection device 404 identifies at least a first data storage device of a plurality of data storage devices 412. Identifying may include, as a non-limiting example, comparing at least a datum received as an identifier from at least a first data storage device to one or more stored values; one or more stored values may be stored in a secure listing as described above. One or more stored values may be stored in a database or other data structure. Identifying may include comparison of a digitally signed assertion and/or secure proof, as described in further detail below, in a secure listing or other data structure to a digitally signed assertion and/or secure proof received from at least a first data storage device.

Still referring to FIG. 5, identifying at least a first data storage device may include evaluating a secure proof generated by the at least a first data storage device and identifying the at least a first data storage device as a function of the secure proof. Secure proof may include any secure proof as described above including without limitation a secure proof demonstrating possession of a secret stored in or produced by secure computing module 416 and/or PUF 424. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange. Secure proof may include a digital signature; this may be implemented, without limitation, as described above in reference to FIGS. 1-3.

At step 510, and with continued reference to FIG. 5, processor calculates a confidence level of the at least a first data storage device; this may be implemented, without limitation, as described above for calculation and/or determination of a confidence level of at least a first remote device. Confidence levels may be established based upon a ranking system by a governing consortium for a network, such that assignment of confidence level for a selection device 404 may occur by comparison to such a ranking system (e.g., based upon attestable properties of the device). Such assignment may require a threshold consensus from previously verified devices 412, from an elected committee, the election of such committee being based upon, e.g. a random beacon approach such as proof of elapsed time or other probabilistic approach. Such a committee may be a subselection of a set of nodes obtaining a minimum threshold of one or more parameters, e.g., confidence level, length of record of honest transactions, dollar value of honest transactions, association via previous transactions with other highly trusted nodes, or any combination thereof. Each device and/or other processor participating in consensus determination of confidence level may perform any action described herein for determining a confidence level, or any combination of such actions.

At step 515, and still referring to FIG. 5, processor assigns a machine learning data storage task to at least a data storage device as a function of at least a confidence level. At least a data storage task, as used herein, is a task whereby the device in question acts as a data store or repository, performing memory storage tasks, data retrieval tasks, query processing tasks, and the like. At least a data storage task may include, without limitation, performing as a database, including without limitation a relational database, key-value datastore, or the like, acting as a node or other element of a distributed data storage network or distributed data storage data structure, storing or acting as a hash table or other data structure for data storage, and/or performing one or more data storage retrieval or writing tasks including processing and responding to queries such as database queries, providing values corresponding to key-value relationships, hash table lookups, and the like, and/or providing any data or portion of data stored on device. Data to be used in machine learning, which may include training datasets or other datasets used to perform machine-learning algorithms as described above, may be voluminous in nature; as a result, use of a plurality of devices to store data in lots may present an efficient way to store data that might otherwise require extensive facilities for storage. Thus, data may be divided into lots or sections, each of which is stored on one or more distinct devices, according to any distributed storage process or protocol as described or alluded to herein.

Still referring to FIG. 5, assigning at least a machine learning data storage task may include assigning a first data storage task to a first data storage device and assigning a second data storage task to a second data storage device. First data storage task and second data storage task may be redundant; as used herein two data storage tasks are redundant where the two data tasks share at least a datum to be stored in common. For instance, and without limitation, first and second data storage tasks may be overlapping or identical. An advantage to redundant machine learning tasks may be that if one data storage machine is damaged, degraded, or destroyed, an undamaged data storage device may perform the identical machine learning task; redundant storage may also make it more difficult for a bad actor to sabotage data storage by corrupting, deleting, or otherwise altering a stored element of data and/or a data storage device storing it. Alternatively, first data storage task assigned to at least a first storage device may be distinct from second data storage task assigned to at least a second storage device. For example, and without limitation, machine learning task assigned to each data storage device may be unique and individual.

With continued reference to FIG. 5, as a non-limiting example, assignment of at least a data storage task to the at least a data storage device may include dividing data to be stored in the at least a data storage task into a first data lot and a second data lot, assigning the first data lot to at least a first data storage device, and assigning the second data lot to at least a second data storage device. First data lot and second data lot may be selected according to one or more criteria; such selection criteria may include, without limitation, selection of data lots to preserve relationships used to perform machine learning computations, such as relationships between input and output data, relationships between variables, and the like. For instance, where a given set of variable values pertains to a given "desired" or real-world output to be used in computation of an error function or cost function, the given set of variable values and desired or real-world output may be placed together in the same data lot; this may enable computation to be performed efficiently using such data. Alternatively, relationships may be maintained by any kind of method for linking or recording relationships between data sets, including without limitation links using relational database tables, parallel table structures, shared record identifiers, or the like; persons skilled in the art, upon reviewing the entirety of this disclosure, will be aware of various ways that relationships between elements of data may be maintained while dividing data between distinct storage locations, data structures, and/or devices.

Still referring to FIG. 5, data may be divided in lots according to storage capacity of devices in which data is to be stored; for instance, and without limitation, if a first device has a certain number of bytes available for storage, a first data lot may be created having a number of bytes equal to or less than that storage capacity, while a second data lot may be created having a number of bytes of data equal or less than the storage capacity of a second device. Data storage may be assigned redundantly; for instance, copies of a first data lot may be stored in several devices or device sets, such that if one copy is degraded, damaged, or destroyed, an undamaged copy may be obtained from a different device. This may also make it more difficult for a bad actor to sabotage machine-learning task, as discussed in further detail below.

Still referring to FIG. 5, a processor or other device may encrypt data to be stored in at least a data storage device. Encryption may involve a cryptographic system which involves the use of a datum, known as an "encryption key," to alter plaintext, for instance as described above. In an embodiment, encryption may prevent tampering or unauthorized reading of data by third parties and/or at least a data storage device from reading, deciphering, or modifying the data. In an embodiment, encryption of data may involve a data storage device that may not decrypt the data.

With continued reference to FIG. 5, selection of encryption methods used in encrypting data for at least a data storage task may be performed according to any public or private key cryptographic system as a function of confidence level. Data storage devices having confidence levels below a threshold level may be eliminated. For instance, where there is a verified data storage device which greatly exceeds threshold confidence level, encryption may be performed so as to permit verified data storage device to decrypt data, for instance by encrypting using a public key of a public key cryptographic system for which verified device possesses a private key, or using a symmetric cryptographic system for which verified device possesses a key. Alternatively or additionally, an unverified data storage device minimally exceeding the threshold level, or failing a threshold level to be considered a verified device while exceeding a threshold required to be assigned data storage tasks may be performed using a cryptographic system for which the data storage device does not possess a decryption key. In an embodiment, selection device 404 and/or at least a computation device encrypts data to be stored using a private key of a private key cryptographic system; private key may, in a non-limiting example, not be shared with at least a data storage device storing private key. Encryption and/or decryption keys may be generated using secure proof, such as using physically unclonable function (PUF), for instance as described in further detail in this description. Further, in some embodiments a public key may be generated using a digital certificate. In an embodiment where a first data storage device and second data storage device are assigned data storage tasks, encryption may be performed by encrypting data to be stored in the first data storage device with a first encryption key and encrypting data to be stored in the second data storage device with a second encryption key, wherein the first encryption key is distinct from the second encryption key; second encryption key and first encryption key may be distinct from each other.

With continued reference to FIG. 5, encrypting may be performed according to any public or private key cryptographic system as a function of confidence level and trustworthiness of a data storage device. Selecting between public or private key would be calculated as a function of confidence level. Mathematic relationships and statistics calculating trustworthiness may demonstrate, e.g. that a certain number of nodes in at least a highly trusted node results in a 95% degree of confidence, that a second, higher number of nodes results in a 98% degree of confidence, and the like. Trustworthiness levels below a threshold level may be eliminated. In an embodiment, encrypting data to be stored in the at least a first data storage device with a first encryption key, and encrypting data to be stored in the at least a second data storage device with a second encryption key, wherein the first encryption key is distinct from the second encryption key. In an example, the first data storage device may be highly trusted and as such, a public encryption key corresponding to a private key possessed by first data storage device may be utilized. However, the second data storage device may be less highly trusted and as such, a private encryption key and/or a public key for which second data storage device does not possess a private key may be utilized. As another non-limiting example, robustness of the confidence level of the at least a data storage device may influence physical location of encryption key. For example, the at least a first data storage device that has a highly trusted and robust confidence level may contain an encryption key directly on the data storage device. Where the at least a second data storage device that has a less robust confidence level but still exceeds the threshold minimum, encryption key may not be located on the second data storage device.

Still referring to FIG. 5, in an embodiment, selection device 404, at least a first data storage device, and/or other device may insert at least an additional datum into data to be stored by the at least a first data storage device. Inserted data may include other data that will be stored together on the at least a data storage device. As a non-limiting example, selection device 404, at least a first data storage device, and/or other device may insert a contextual datum to be stored by the at least a first data storage device. Contextual datum be a datum not used for the machine learning algorithm; contextual datum may include a metadatum. For instance, in an embodiment, selection device 404, at least a first data storage device, and/or other device may insert padding into the data lot, to "tamper-proof" data and or make decryption attempts to retrieve and extract data by bad actors more difficult. Padding may include inserting random dummy data before encryption. Alternatively or additionally, in an embodiment, selection device 404, at least a first data storage device, and/or other device may remove one or more elements of contextual data from data to be stored by the at least a first data storage device. For instance, data containing names or personal identifying information may be removed when such information is not necessary in computation. The resulting datum may be stored in the at least a data storage device.

In an embodiment, and still viewing FIG. 5, selection device 404 may alternatively or additionally treat data to be stored in data storage task to improve privacy protection. As a non-limiting example, first selection device 404 may perform one or more initial machine-learning tasks, either alone or in conjunction with one or more additional devices, such as without limitation verified devices, to eliminate concentrations of potentially private data; concentrations of potentially private data may, for instance, lead certain machine-learning tasks to over-emphasize a given dataset containing private information. For instance, certain machine-learning applications only are able to function if model-creation algorithms underlying them have access to potentially private or sensitive data, including without limitation users' medical records, private photographs, genetic sequences, and/or people and/or entities with whom they are in contact; this may give rise to a risk that certain attacks could deduce that private information from a resulting model. First selection device 404 and/or one or more additional devices, alone or in concert, may modify data to be used in machine learning process by dividing sensitive data into subsets that are non-intersecting. Each subset may be provided to a "teacher" model, which may perform supervised or unsupervised learning on the subset; the output of all teacher models may then be organized into an aggregate output and recombined with non-sensitive data. This may create a set that will cause a subsequent, or "student" machine-learning algorithm not to depend on any one sensitive training data point, such as a set of data corresponding to a single person. Teacher model outputs may be achieved by querying all teacher models for a given prediction and aggregating the resulting prediction. In an embodiment, outputs provided for a given prediction from teacher models may be aggregated by restricting to a limited number of votes, such as a topmost vote of a given set of teacher model outputs, as computed using an output associated with a highest number of matching predictions; random noise may further be added to the outputs prior to collection of limited number of votes, causing a randomized, but probabilistically supported output to be used. As a result, output may be highly useful in the main "student" learning process, while effectively anonymizing itself; the set of such outputs may be reincorporated with non-private data, leading to a process of removal of contextual data, generalizing contextual data via an initial machine-learning process, and reintroduction of the contextual data. As a result, data storage devices may have no access to un-generalized contextual data, and subsequent machine-learning processes may be unable to produce models capable of revealing the contextual data in a non-generalized, and thus compromising, form. Teacher-generated predictions may be reintegrated with non-generalized data; in other embodiments, they may be stored in a separate lot, which may be accomplished as described above. In an embodiment, teacher-generated predictions are stored in a data storage device, or collection thereof, having a high degree of confidence, as calculated according to any process, process step, or combination thereof described in this disclosure.

Continuing to reference FIG. 5, in an embodiment, selection device 404, at least a first data storage device, and/or other device may generate cryptographic hashes, a checksum, or another such data element. As described in further detail above, a hash is a mathematical representation of data to be stored in the data storage device, and permits any device to verify that a given lot of data produces the corresponding mathematical representation. In some embodiments, data is encrypted with hashed information to ensure safety of data and make it tamper proof. The mathematical representation of data is produced by a lossy "one-way" algorithm known as a "hashing algorithm." Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below. Where a given quantity or element of data from lot is likely to be retrieved for a given computational task, as defined above, and/or where data is stored and retrieved in some atomic quantity of data such as "bytes" or "words" in X86 storage, each such given quantity and/or element, or some quantity thereof, may have a mathematical relationship generated; thus, for instance, if the mathematical relationship of a first quantity of data in a given data lot suggests tampering or degradation of that data, but a second mathematical representation of a second quantity data from the lot does not, the second data may be used, while the first may be retrieved from a redundant storage source that does not bear the same corruption or tampering, or may be discarded from use in the computational task. In an embodiment, hashes of atomic quantities or other sub-quantities of data may enable selection device 404 and/or other devices to verify that data has not been modified, without having to hash a large quantity of data for each such verification.

Still viewing FIG. 5, in an embodiment, and as further noted above, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein.

With continued reference to FIG. 5, in an embodiment, selection device 404, at least a first data storage device, and/or other device may generate at least a cryptographic hash, checksum, or another such data element from a data set prior to encryption of data. For example, the cryptographic hash that is generated may be stored, and the data used to produce the hash may subsequently be encrypted; this may make it harder for an adversary to generate the hash from altered data, because the encrypted data has been transformed from its original plain text state, effectively requiring collision searches to explore a greater range of possible values. In an embodiment, selection device 404, at least a first data storage device, and/or other device may generate at least the cryptographic hash, checksum, or another such data element from a data set after encryption of the data set. In this example, the cryptographic hash may be available to be checked by others, and data alterations may result in noticeably different hashes produced. This may also deter bad actors because it may still be computationally infeasible to generate the same hash from modified data, while any element of system 400 is able to verify whether changes have occurred by hashing encrypted data.

Still referring to FIG. 5, in an embodiment, selection device 404, at least a first data storage device, and/or other device may perform redundant storage. Redundant storage may be used to increase the probability that a given lot of data in at least one location without damage. In an embodiment, a plurality of data storage devices of the at least a data storage device may be selected to store data redundantly. Selection device 404, at least a first data storage device, and/or other device may select at least a data storage device to store data redundantly, as a function of confidence level of data storage and importance of data, alone or together in the aggregate thereby having multiple data storage devices attain threshold level. Confidence level may be calculated based on past transactions and mathematical relationships and statistical analysis as described above, as well as importance of data to be stored. Confidence levels failing to meet a set threshold level may be eliminated. For example, low confidence level and high importance of at least a data storage device may result in greater redundant storage on the at least a data storage device. A high confidence level and low importance of at least a data storage device will result in lesser redundant storage on the at least a data storage device. In another example, confidence level of storage devices may be used in aggregate, so that a plurality of data storage devices each having a relatively low confidence level may together in the aggregate equate to a higher combined confidence level of at least one highly trusted data storage device. As a non-limiting example, a confidence level of the three data storage devices may equate to a confidence level of one trusted data storage device. Further continuing the example, where importance of data to be stored requires storage in two highly trusted devices, a selection of a first highly trusted device and three devices having lower confidence levels may result in an equivalent aggregate confidence level in the overall storage selection and fulfill the overall requirements for storage of the data.

In an embodiment and still referring to FIG. 5, selection device 404, at least a first data storage device, and/or other device may assign a data storage task to a distributed framework of data storage devices, where a distributed framework may include any distributed framework as described above. Selection of a distributed framework may be performed, without limitation, as described above in reference to FIGS. 1-3.

In an embodiment and with continued reference to FIG. 5, selection device 404, at least a first data storage device, and/or other device may retrieve data from at least a data storage device. For instance, data may be retrieved in some atomic quantity of data such as "bytes" or "words" in X86 storage, where each such given quantity and/or element, or some quantity thereof, may have a mathematical relationship generated and computed for retrieval purposes. In yet another example, data may be retrieved from redundant storage. In an embodiment, selection device 404, at least a first data storage device, and/or other device may retrieve data from at least a data storage device on a decentralized redundant storage framework.

Still referring to FIG. 5, in an embodiment, selection device 404, at least a first data storage device, and/or other device may convert encrypted data back into plaintext, through the process of decryption. Decryption process may involve the use of a datum, known as a "decryption key," to return the cyphertext to its original plaintext form, for instance as described above. Decryption can occur in many ways including but not limited to symmetric decryption keys, asymmetric decryption keys, digital signatures, and repeating a hashing algorithm. In an embodiment of symmetric decryption, decryption key is essentially the same as encryption key. Possession of either key makes it possible to deduce the other key quickly without further secret knowledge. In an embodiment of asymmetric decryption, decryption key is not the same as encryption key, and as such the encryption key may safely be made available to the public. One such example of a public system is RSA.

With continued reference to FIG. 5, in an embodiment, selection device 404, at least a first data storage device, and/or other device may verify the authenticity of retrieved data as a function of the original data. In an embodiment, selection device 404, at least a first data storage device, and/or other device may evaluate retrieved data by hashing its corresponding message through the corresponding algorithm associated with the hash and comparing the corresponding message to the original entry. Verification of the hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below.

Still referring to FIG. 5, in an embodiment, selection device 404, at least a first data storage device, and/or other device may evaluate retrieved data by verifying verification datum corresponding to secure proof. Secure proof may, for instance, include a digital signature generated using a private key of a public key cryptographic system, and verification datum may include a corresponding public key. Evaluations to verify public key cryptographic system may ensure validity of retrieved data Still referring to FIG. 5, in an embodiment selection device 404 and/or other device may determine that one more elements of retrieved data have failed authentication. Where a given element of data fail authentication, selection device 404, at least a first data storage device, and/or other device may perform one or more steps as a consequence. For example, and without limitation, selection device 404 and/or other device may assign a reduced confidence level to at least a first data storage device; assigning a lower confidence level may include generating a digitally signed assertion indicating the lower confidence level, and/or recording such an assertion in a data structure, which may include, without limitation, a secure listing as described herein. As a further example, processor and/or other device may discard retrieved data that fails authentication, and/or refrain from using such data a machine learning computational task; selection device 404 and/or other device may retrieve a redundant element of data, as defined above, from an additional data storage device, authenticate the redundant element of data, and use it instead of the element of data that failed authentication. This may help to ensure that undamaged or unaltered data is used in machine learning model generation or similar tasks.

Figure 6:
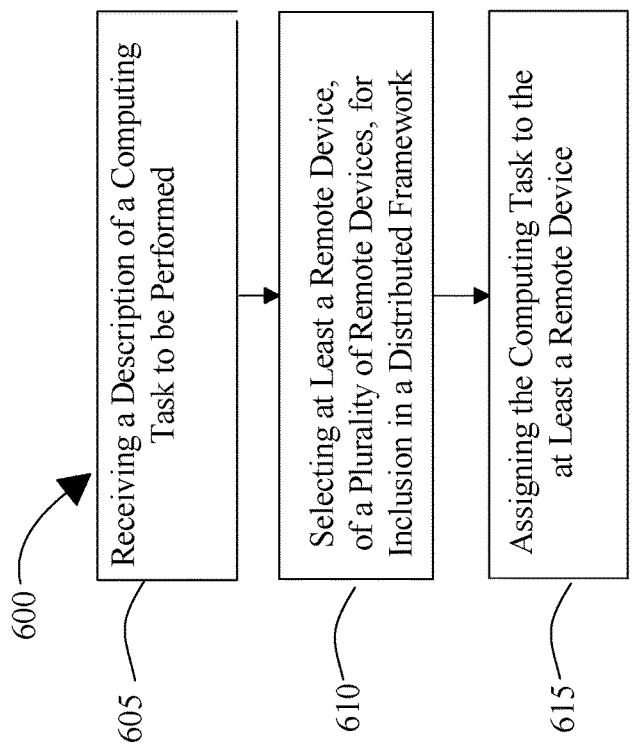
FIG. 6 illustrates particular implementations of various steps of a method of selecting a distributed framework.

Referring now to FIG. 6, an exemplary embodiment of a method 600 of selecting a distributed framework. At step 605, selection device receives a description of a computing task to be performed; this may be performed, without limitation, as described above in reference to FIGS. 1-5. Receiving a description of a computing task may include receiving a confidence level of a device and/or set of devices to carry out the computing task, where a confidence level may be defined, determined, assigned, and/or calculated as described above. Receiving a description of a computing task may include receiving a description of a category of computing task, such as a computational task, defined as a task to perform a given computation, algorithm, and/or portion thereof, a software service, a microservice, a data storage task, a machine-learning task, a key management service, identity service, authentication service, infrastructure service, platform service, or the like; category of computing task may include an authentication and/or authorization task, which may be performed, without limitation, as described in U.S. Nonprovisional application Ser. No. 16/681,750. Receiving the description of the computing task may include receiving a description of a category of computing resources, such as processor speeds, number of processor cores, communication latency between processors/processor cores, amounts of memory, or the like. Receiving the description of the computing task may include receiving a description of an amount of memory needed to perform the computing task; such as an amount of memory necessary for data storage, program instructions, or the like. Receiving the description of the computing task may include receiving a description of a number of computational cycles, such as clock cycles, needed to perform the computing task. Receiving the description of the computing task may include receiving a description of a type of hardware, such as in non-limiting example a CPU, GPU, FPGA, TPU or other hardware accelerator, storage system, IoT device, software defined networking component such as an Evolved Packet Core, Mobility Management Entity, Serving Gateway, Packet Data Network Gateway, Home Subscriber Server, Access Network Discovery and Selection Function, Evolved Packet Data Gateway, Access Point, or any hardware or virtualized hardware that performs similar functionality, sensor or other peripheral device, needed to perform the computing task. Receiving the description of the computing task may include receiving a description of a geographical region in which resources are needed to perform a computing task. Receiving the description of the computing task may include receiving a set of constraints, which may include one or more security constraints on computing resources, such as in non-limiting example the security classification of the resource or hosting facility, data sovereignty requirements, confidentiality requirements, physical security requirements, industry certifications, compliance certifications and the like; constraints may include required confidence levels of one or more computing resources, aggregate confidence levels exceeding a threshold amount, one or more credentials included in and/or capable of inclusion in an authorization token as above, or the like. Requirements may include at least a resource distribution requirement, defined for the purposes of this disclosure as a requirement specifying a manner in which a computing task is distributed between two or more computing devices, including without limitation a requirement to perform computations and/or storage redundantly, in parallel, according to distributed storage protocols such as distributed hash trees, temporally sequential listings, or the like, load balancing requirements, distribution and/or redundancy across geographical locations, or the like. Requirements may be defined in a range, as minimums or maximums, as relative or absolute parameters. Requirements may further include distribution across at least a geographical region, across multiple physical or virtual machines, or other means of distributing a computing task, e.g. in nonlimiting example to ensure robustness against system failures. Receiving the description of the computing task may include receiving the computing task from a user; description may alternatively or additionally be received from another computing device, such as a device that received a computing task and is assigning a sub-task to further devices.

Still referring to FIG. 6, at step 610, selection device selects at least a remote device 112, of a plurality of remote devices 112, for inclusion in a distributed framework; this may be performed, without limitation, as described above in reference to FIGS. 1-5. Selecting includes receiving a first authorization token, which may include any authorization token as described in this disclosure, including a secure proof of an attestation conferring a first credential on the at least a remote device 112. First authorization token may be received from at least a remote device 112 and/or from another device. For instance, and without limitation, authorization token may be received from a device that was previously selected by selection device according to any process described in this disclosure, which may in turn delegate one or more tasks to additional remote devices 112. Selecting at least a remote device 112 includes evaluating first authorization token. Evaluating first authorization token may include verifying inclusion of the secure first credential in a secure listing 204 as described above. Evaluating first authorization token may include identifying a temporal attribute of the first authorization token and evaluating the temporal attribute. In an embodiment, wherein first credential is included in a chain of attestation, which may be implemented according to any chain of attestation and/or anonymized chain of attestation as described in Nonprovisional application Ser. No. 16/682,809, evaluating first authorization token may include evaluating the chain of attestation, where evaluation may be performed, without limitation, as described in Nonprovisional application Ser. No. 16/682,809.

Still referring to FIG. 6, selecting the at least a first remote device 112 may include selecting the at least a remote device 112 based on the evaluation of the first authorization token. For instance, and without limitation, selecting device 104 may determine whether the first credential authorizes the at least a first remote device 112 to perform the computing task and/or a sub-task thereof. As a further non-limiting example, selecting device 104 may determine a confidence level based on the authorization token and/or credential, and determine whether the at least a first remote device 112 has and/or is associated with a sufficiently high confidence level to perform computing task and/or a sub-task thereof. Selection device 104 may evaluate a temporal attribute of first authorization token, for instance by determining how recently first authorization token was generated, whether first authorization token has expired, or the like.

With continued reference to FIG. 6, selection may alternatively or additionally be made according to any criteria described above for selection, and/or any criteria received with description of computing task, including without limitation based on proximity as described above, where proximity may include to a device and/or location that is specified in the description of the computing task to be performed, proximity to and/or location within a geographic area described in description of computing task, or the like. For instance, and without limitation, where plurality of remote devices 112 is connected to the selection device via a network, selecting the distributed framework may include selecting at least a proximate remote device 112 of the plurality of remote devices 112 in a graph representing the network. This may be implemented without limitation as described above in reference to FIGS. 1-5. As a further non-limiting example, selecting the at least a remote device 112 further comprises selecting at least a geographically proximate remote device 112 of the plurality of remote devices 112. This may be implemented without limitation as described above in reference to FIGS. 1-5. As an additional example, selecting the at least a remote device 112 may include selecting at least a temporally proximate remote device 112. This may be implemented without limitation as described above in reference to FIGS. 1-5. As another example, selecting the at least a remote device 112 may include selecting at least a remote device 112 to minimize total communication latency. This may be implemented without limitation as described above in reference to FIGS. 1-5. Selection may alternatively or additionally be performed based on a description of a category of computing task, a description of a category of computing resources, an amount of memory needed to perform the computing task, a description of a number of computational cycles needed to perform the computing task, a type of hardware needed to perform the computing task, a description of a geographical region in which resources are needed to perform a computing task, or any other criteria in description of computing task, by determining whether at least a remote device 112 meets any such category or requirement, including without limitation according to any process and/or process step described in this disclosure. Selection may be performed, without limitation, using a random oracle process as described in U.S. Nonprovisional application Ser. No. 16/681,750.

At step 615, selection device assigns computing task to selected at least a remote device 112; this may be performed, without limitation, as described above in reference to FIGS. 1-5. Assigning the computing task to the at least a remote device 112 may include generating a second authorization token, wherein the second authorization token authorizes the at least a remote device 112 to perform the computing task. Generating the second authorization token may include receiving a second credential, and delegating the second credential to the at least a remote device 112; delegation may be performed, without limitation, as described in U.S. Nonprovisional application Ser. No. 16/682,809. Assigning the computing task to the at least a remote device 112 may include revealing the identity or address (in non-limiting example the IP address or other physical or virtual addressing method) of the remote device 112 to the computing task owner, may include revealing the identity of the computing task owner to the at least a remote device 112, separately or in addition to a token based or other authorization conferring mechanism as described herein. Selection device may, without limitation, divide computational task in to at least a high-security sub-task and a low-security sub-task; for instance, and as described above, data storage may be delegated to and/or assigned to a remote device 112 of at least a first remote device 112 that has a relatively low confidence level, for instance where the data to be stored is encrypted, stored redundantly, or the like, whereas storage of unencrypted data and/or processing of data that requires attested computing and/or access to unencrypted data may be assigned to a remote device 112 of at least a remote device 112 having a relatively high confidence level associated therewith.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
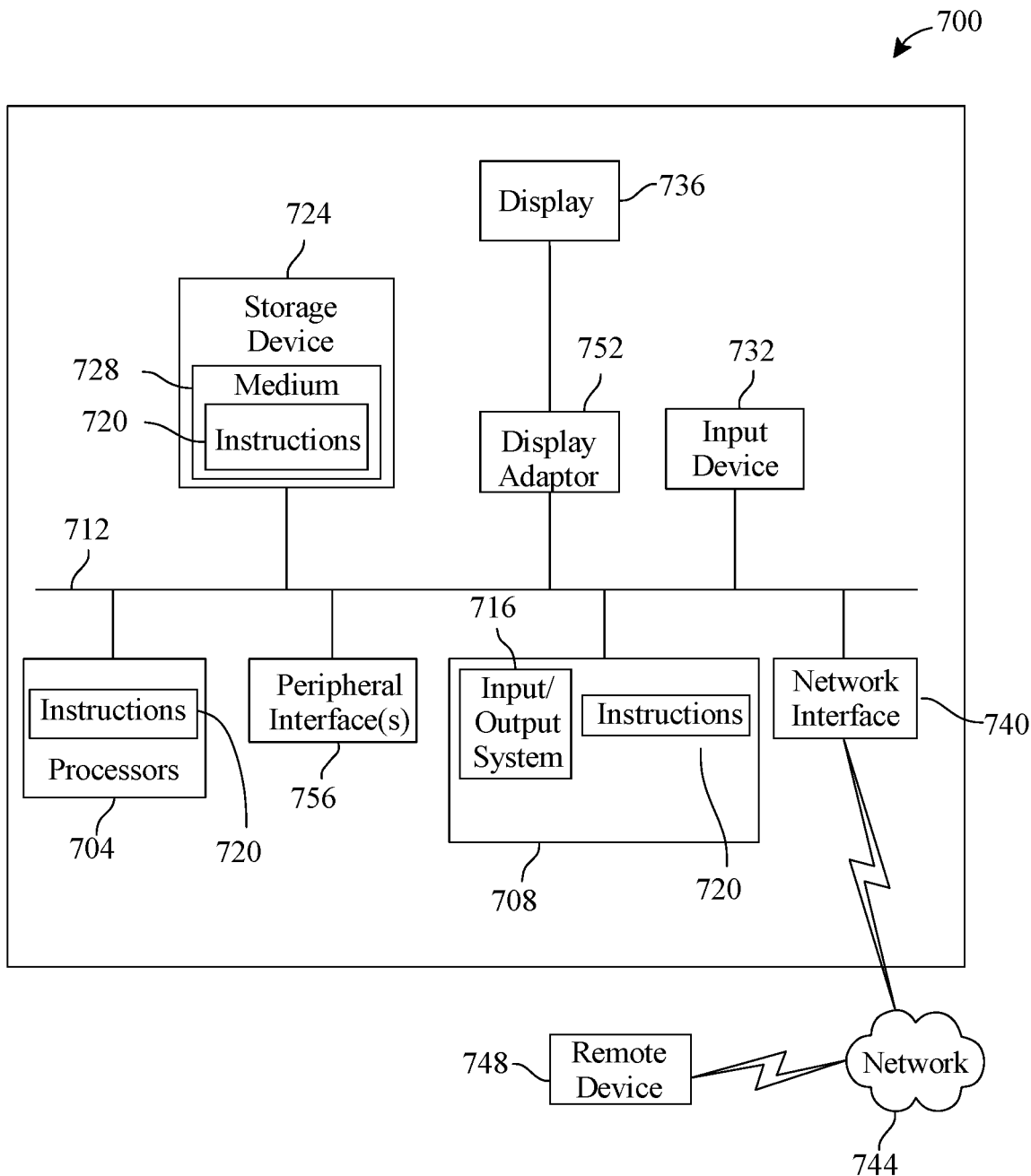
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of selecting a distributed framework, the method comprising:
receiving, by a selection device, a description of a computing task to be performed;
selecting, by the selection device, at least a remote device, of a plurality of remote devices, for inclusion in a distributed framework, wherein selecting further comprises:
receiving an authorization token including a secure proof of an attestation conferring a credential on the at least a remote device, wherein the authorization token is generated from a physically unclonable function;
evaluating the authorization token; and
selecting the at least a remote device based on the evaluation of the authorization token;
determining, by the selection device, a confidence level of the at least a remote device, wherein determining a confidence level includes:
evaluating at least a digitally signed assertion signed by a remote device of the at least a remote device; and
assigning a confidence level to the remote device as a function of the evaluation of the at least a digitally signed assertion; and
assigning, by the selection device, the computing task to the at least a remote device.

2. The method of claim 1, wherein receiving the description of the computing task further comprises receiving a description of an amount of memory needed to perform the computing task.

3. The method of claim 1, wherein receiving the description of the computing task further comprises receiving a description of a number of computational cycles needed to perform the computing task.

4. The method of claim 1, wherein receiving the description of the computing task further comprises receiving a description of a type of hardware needed to perform the computing task.

5. The method of claim 1, wherein receiving the description of the computing task further comprises receiving a description of a geographical region in which resources are needed to perform a computing task.

6. The method of claim 1, wherein receiving the description of the computing task further comprises receiving a description of a security constraint for resources needed to perform the computing task.

7. The method of claim 1, wherein receiving the description of the computing task further comprises a resource distribution requirement.

8. The method of claim 1, wherein evaluating the authorization token further comprises verifying inclusion of the secure credential in a secure listing.

9. The method of claim 1, wherein evaluating the authorization token further comprises:
identifying a temporal attribute of the authorization token; and
evaluating the temporal attribute.

10. The method of claim 1, wherein:
the credential is included in a chain of attestation; and
evaluating the authorization token further comprises evaluating the chain of attestation.

11. The method of claim 1, wherein:
the plurality of remote devices is connected to the selection device via a network; and
selecting the distributed framework further comprises selecting at least a proximate remote device of the plurality of remote devices in a graph representing the network.

12. The method of claim 1, wherein selecting the at least a remote device further comprises selecting at least a geographically proximate remote device of the plurality of remote devices.

13. A system for selecting a distributed framework, the system comprising:
a selection device in communication with a plurality of remote devices, the selection device designed and configured to:
receive a description of a computing task to be performed;
select at least a remote device, of a plurality of remote devices, for inclusion in a distributed framework, wherein selecting further comprises:
receiving an authorization token including a secure proof of an attestation conferring a credential on the at least a remote device, wherein the authorization token is generated from a physically unclonable function;
evaluating the authorization token; and
selecting the at least a remote device based on the evaluation of the authorization token;
determine a confidence level of the at least a remote device, wherein determining a confidence level includes:
evaluating at least a digitally signed assertion signed by a remote device of the at least a remote device; and
assigning a confidence level to the remote device as a function of the evaluation of the at least a digitally signed assertion; and
assign the computing task to the at least a remote device.

14. The system of claim 13, wherein the selecting device is further configured to receive the description of the computing task by receiving a description of an amount of memory needed to perform the computing task.

15. The system of claim 13, wherein the selecting device is further configured to receive the description of the computing task by receiving a description of a number of computational cycles needed to perform the computing task.

16. The system of claim 13, wherein the selecting device is further configured to receive the description of the computing task by receiving a description of a type of hardware needed to perform the computing task.

17. The system of claim 13, wherein the selecting device is further configured to receive the description of the computing task by receiving a description of a geographical region in which resources are needed to perform a computing task.

18. The system of claim 13, wherein the selecting device is further configured to evaluate the authorization token by verifying inclusion of the secure credential in a secure listing.

19. The system of claim 13, wherein the selecting device is further configured evaluate the authorization token by:
identifying a temporal attribute of the authorization token; and
evaluating the temporal attribute.

20. The system of claim 13, wherein:
the credential is included in a chain of attestation; and
the selecting device is further configured to receive evaluate the authorization token by evaluating the chain of attestation.

21. The system of claim 13, wherein:
the plurality of remote devices is connected to the selection device via a network; and
the selecting device is further configured to select the at least a remote device by selecting at least a proximate remote device of the plurality of remote devices in a graph representing the network.

22. The system of claim 13, wherein the selecting device is further configured to select the at least a remote device further comprises selecting at least a geographically proximate remote device of the plurality of remote devices.

* * * * *